United States Patent [19]
Kilsdonk

[11] Patent Number: 5,518,669
[45] Date of Patent: May 21, 1996

[54] METHOD AND DEVICE FOR MANUFACTURING LIGHT PANELS

[75] Inventor: Roger L. H. Kilsdonk, Rotterdam, Netherlands

[73] Assignee: Tchai Lights B.V., Ridderkerk, Netherlands

[21] Appl. No.: 216,548

[22] Filed: Mar. 22, 1994

[30] Foreign Application Priority Data

Mar. 23, 1993 [NL] Netherlands ............................ 9300516
Sep. 14, 1993 [NL] Netherlands ............................ 9301585

[51] Int. Cl.[6] .......................... B29C 39/10; B29D 11/00
[52] U.S. Cl. ..................... 264/1.24; 264/1.28; 264/299; 425/123; 425/125; 425/126.1
[58] Field of Search ................................ 264/1.24, 1.28, 264/299; 425/125, 126.1, 123

[56] References Cited

U.S. PATENT DOCUMENTS

| | | | |
|---|---|---|---|
| 2,931,065 | 4/1960 | Paoli . | |
| 3,084,391 | 4/1963 | Parstorfer . | |
| 3,402,000 | 9/1968 | Crawford . | |
| 3,644,922 | 2/1972 | James et al. . | |
| 3,853,658 | 12/1974 | Ney | 156/180 |
| 4,090,104 | 5/1978 | Vann et al. . | |
| 4,737,215 | 4/1988 | Stoffels et al. | 156/166 |

FOREIGN PATENT DOCUMENTS

| | | |
|---|---|---|
| 0060721 | 9/1982 | European Pat. Off. . |
| 1467114 | 12/1965 | France . |
| 1929117 | 2/1971 | Germany . |
| 3720136A | 1/1988 | Germany . |
| 4029666A | 3/1992 | Germany . |
| 1431157 | 4/1976 | United Kingdom . |
| 1449950 | 9/1976 | United Kingdom . |
| WO92/08593 | 5/1992 | WIPO . |

*Primary Examiner*—Mathieu D. Vargot
*Attorney, Agent, or Firm*—Dressler, Goldsmith, Shore & Milnamow, Ltd.

[57] ABSTRACT

A method of manufacturing light panels using a plate- or sheet-like carrier having optical fibers therein ending according to a certain pattern. The optical fibers (4) taken from a fiber supply are positioned in accordance with said pattern by means of a pattern plate (5). The optical fibers (4) lying on the side of the pattern plate (5) remote from the fiber supply (21) are introduced into a mould (1) in order to have them surrounded by a layer of a castable or injectable and quickly setting material (3) for forming the carrier. The fibers (4) are held in the desired position at the upper surface of the carrier to be formed within the mould (1) and the fiber ends are deflected in a group out of the mould (1). The fibers (4) exiting from the carrier are then cut near the surface of the carrier within the mould (1) directed to the positioning means (5) after the material has set to an extent that the optical fibers (4) exiting out of the carrier surface directed to the positioning means (5) maintain their orientation substantially normal to said carrier surface. The invention also includes an apparatus to carry out this method.

17 Claims, 19 Drawing Sheets

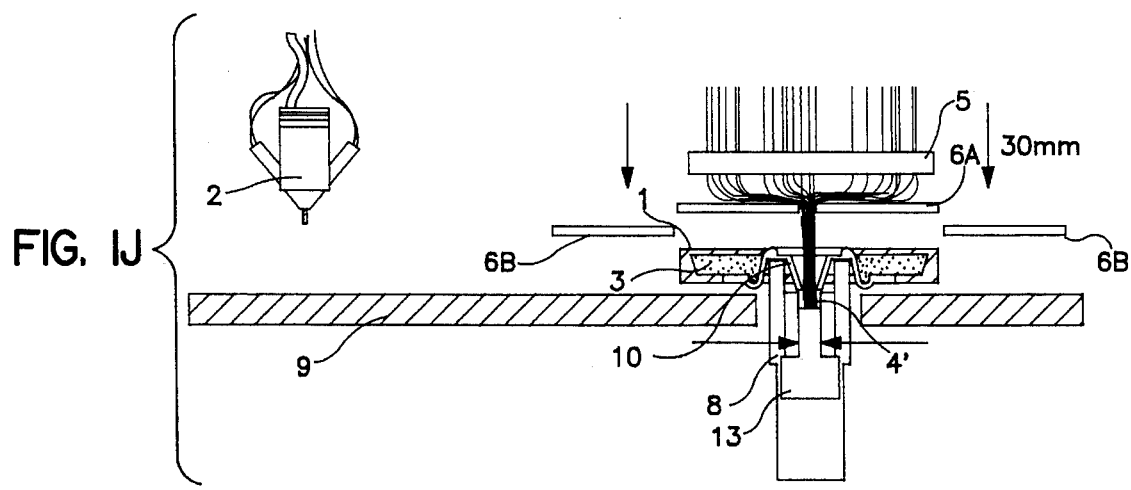
FIG. IJ
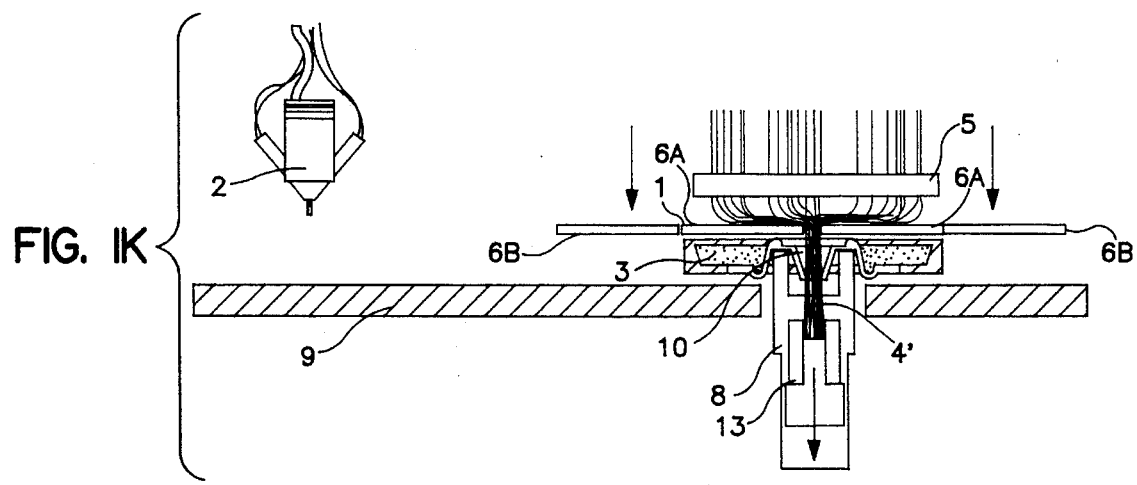
FIG. IK
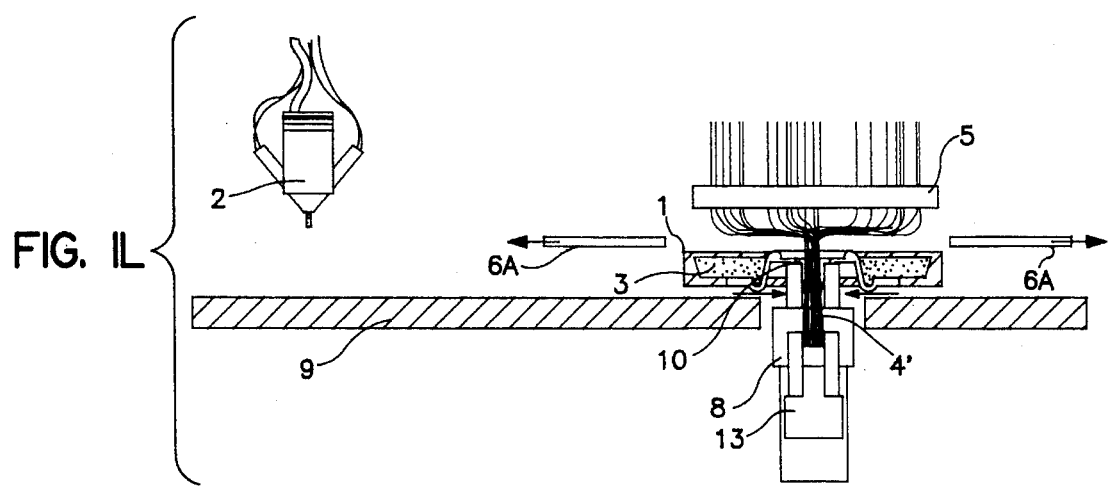
FIG. IL

METHOD AND DEVICE FOR MANUFACTURING LIGHT PANELS

The invention relates to a method of manufacturing light panels, as well as to a device for manufacturing such panels.

RELATED APPLICATION

A method and device for manufacturing light panels is known from PCT application No. WO 92/08593. According to the method disclosed therein, fiber ends originating from a fiber supply are inserted through openings in the base of a mould, the mould is then filled with a layer of castable or injectable and quickly setting material to form the carrier, the carrier is released and removed from the mould once it has set sufficiently, and the fibers are cut to the desired length.

BACKGROUND OF THE INVENTION

Such a method has the disadvantage that, in time, the fibers easily get stuck in the openings in the mould base as a result of synthetic resin which has run into the openings. As a consequence, the mould has to be cleaned each time after manufacturing a number of light panels and the fibers will have to be inserted through the openings in the mould base again.

SUMMARY OF THE INVENTION

The object of the invention is to provide a method in which this disadvantage is removed in an effective way.

For this purpose, the method according to the invention is characterized by positioning the optical fibers taken from a fiber supply in accordance with said pattern by means of positioning means, introducing into a mould the optical fibers lying on the side of the positioning means remote from the fiber supply in order to have them surrounded by a layer of a castable or injectable and quickly setting material for forming the carrier, arranging the positioning means at the upper surface of the carrier to be formed within the mould, guiding the fiber ends out of the mould, grouped and by deflection, cutting the fibers exiting from the carrier near the carrier surface within the mould directed to the positioning means after the material has set to an extent that the optical fibers exiting out of the carrier surface directed to the positioning means maintain their orientation substantially normal to said carrier surface.

Because, according to the invention, not the mould itself, but separate positioning means cause the optical fibers to be kept in the desired pattern, the passage openings of the positioning means do not have to come into contact with the setting material thereby allowing the elimination of the problem of the optical fibers getting stuck in the passage openings. As a result thereof, a large quantity of light panels may be manufactured without requiring the optical fibers to be inserted again after a cleaning operation. Also, the positioning means do not have to perform a sealing function anymore so that the fibers may run through it with little or no friction and it is not required anymore to exert great forces to pull the optical fibers, sometimes in a great number, through the positioning means. It is noted that, if desired, the fiber positioning means may intentionally be brought into contact with the setting material, for example when the fiber positioning means are constructed as cover for the mould thereby creating a closed mould in which the quickly setting material may be introduced by injection moulding or in which a foamed plastic may be moulded into a carrier. Another advantage of the invention is the possibility to work with several moulds, because a mould is released from the fiber supply after cutting the optical fibers, since the mould is positioned on the side of the fiber positioning means remote from the fiber supply. The setting operation of the material may hence be effected simultaneously with the manufacturing of a new light panel thereby enabling a higher production rate. The quickly setting material may also be put in a mould while a light panel is shaped in another mould which, in particularly when using a two component resin, saves a lot of time because this resin needs time to reach the right elevated temperature by reaction of its components. The method according to the invention also causes the optical fibers to be better locked in the carrier since the fibers are deflected within the carrier. If desired, it is possible to manufacture light panels having a smaller thickness without creating the risk of the fibers being pulled loose of the carrier during the manufacturing process. The invention also provides the possibility of each mould becoming part of the finally shaped light panel.

A favourable embodiment of the method according to the invention is that in which, prior to the introduction of the optical fibers into the mould, the optical fibers lying on the side of the positioning means facing away from the fiber supply are grouped into one or more bundles.

Due to this feature, the optical fibers may be guided out of the mould in a controlled manner.

It is for instance possible that, when the optical fibers lying on the side of the positioning means facing away from the fiber supply are introduced into the mould, the grouped fiber ends are guided out of the mould through at least one opening in a mould wall and are provided with an enclosure preventing the discharge of the material.

In this way, the fiber bundles or fiber bundle may be guided out of the mould in any desired position, while the bundling of the optical fibers makes them directly suitable for cooperation with one or more light sources.

In case the mould is filled with the castable or injectable material before the optical fibers are introduced into the mould, and the bundled optical fibers are guided through the opening provided in the base of the mould, it is favourable if the enclosure for the optical fibers are kept in an upper position when the material is introduced into the mould so as to prevent the material from flowing out of the mould and into the enclosure, and after the introduction of the optical fibers into the enclosure and after sealing the enclosure around the optical fibers, the enclosure is moved such that the material flows into the enclosure and partially around the fiber bundle.

In this manner it is permitted, not withstanding the opening in the mould base, to fill the mould with the castable or injectable material before the enclosure and the fiber bundle are sealed to each other.

As mentioned before, the opening for guiding the optical fibers out of the mould may be arranged both in the base and the side wall of the mould. On the other hand, it is even possible to work without any opening by causing the bundle or bundles to run over the side walls of the mould or cause them to protrude from the image surface turned through 180°.

According to a favourable embodiment of the method according to the invention, foamed plastic is used for the carrier. In this way, for example, light weight ceiling panels for lighting purposes can be manufactured, the optical fibers being fitted in a pattern which may or may not be regular. It is, of course, also possible to manufacture a panel of this type having a two-layer structure, namely a first thin layer composed of solid plastic and a layer of foamed plastic on top of it.

The invention also includes a device to carry out the method described above, a mould for use in such a device and a light panel which is preferably manufactured according to the method as described.

The invention will be explained in greater detail below with reference to the drawing; in the drawing:

DESCRIPTION OF THE PREFERRED EMBODIMENTS

Figure 1A:
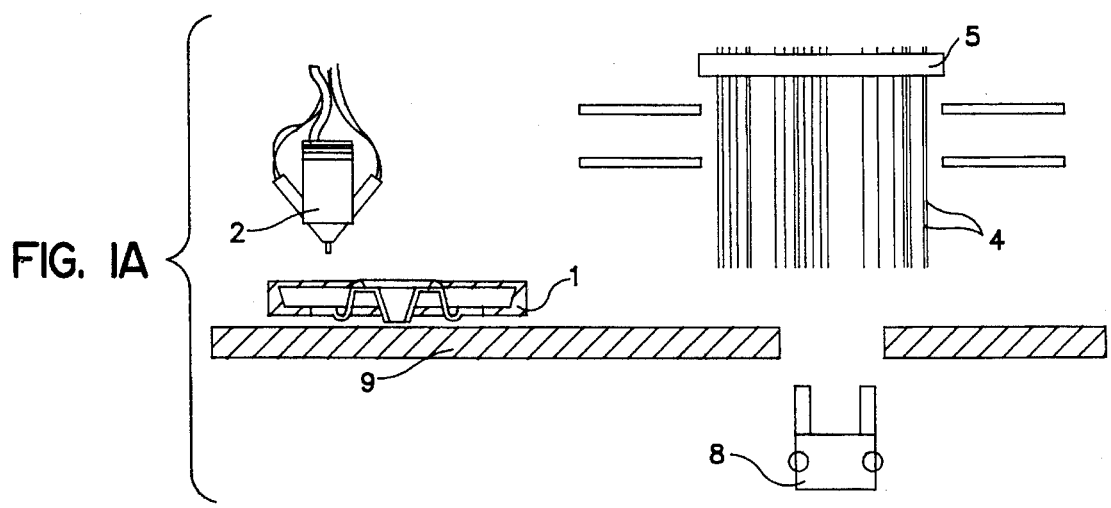
FIGS. 1A–R show diagrammatically the consecutive steps of an exemplary embodiment of the method according to the invention.
Figure 1B:
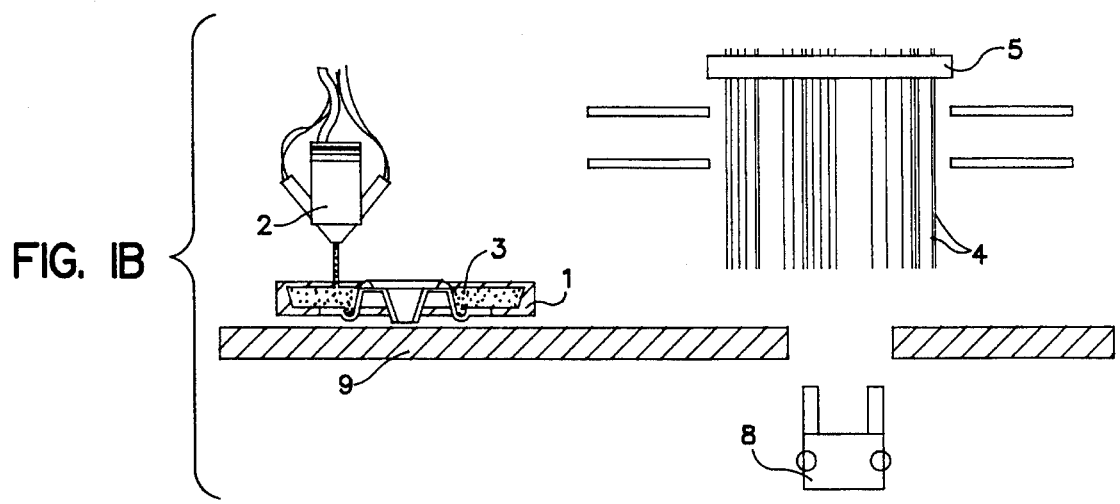

In the various figures like parts are indicated with like reference numerals.

Figure 1C:
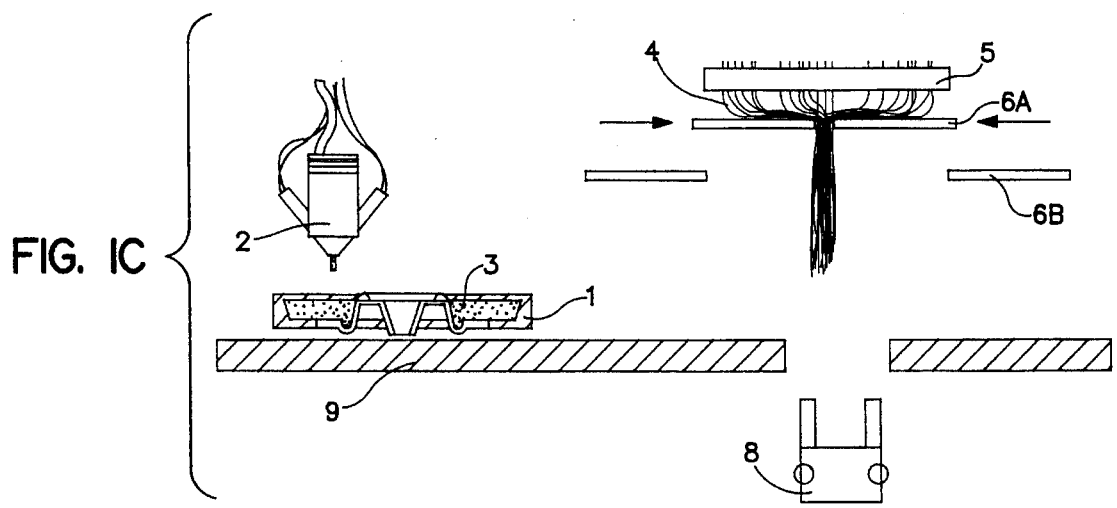
Figure 1D:
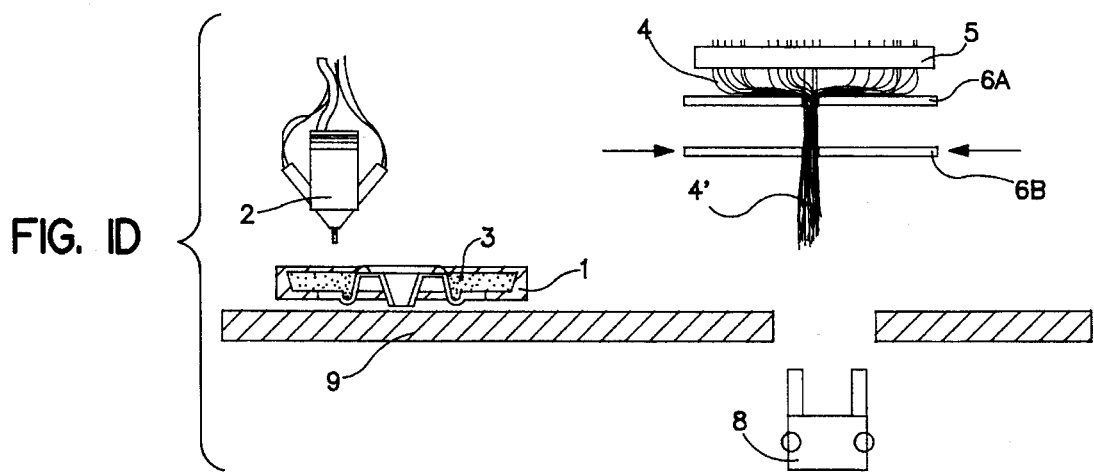
Figure 1E:
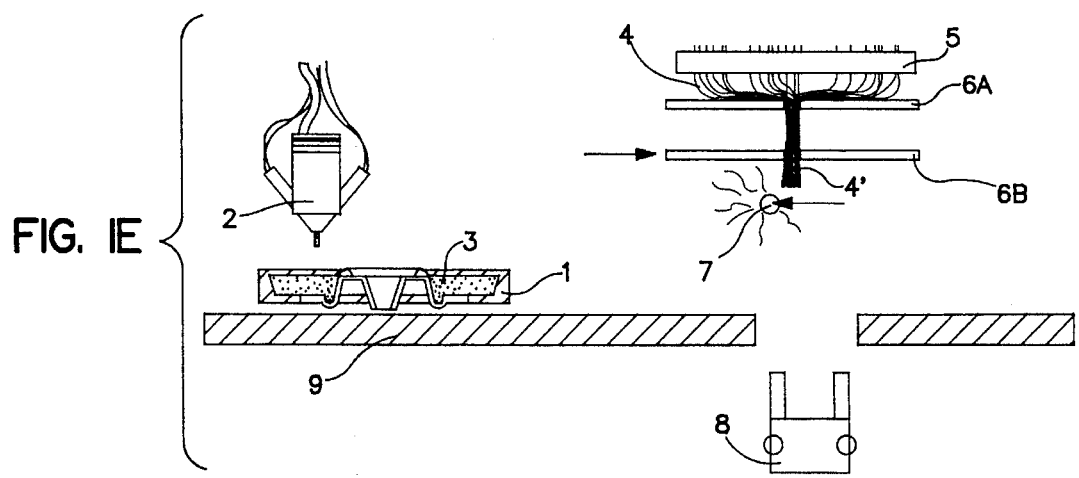
Figure 1F:
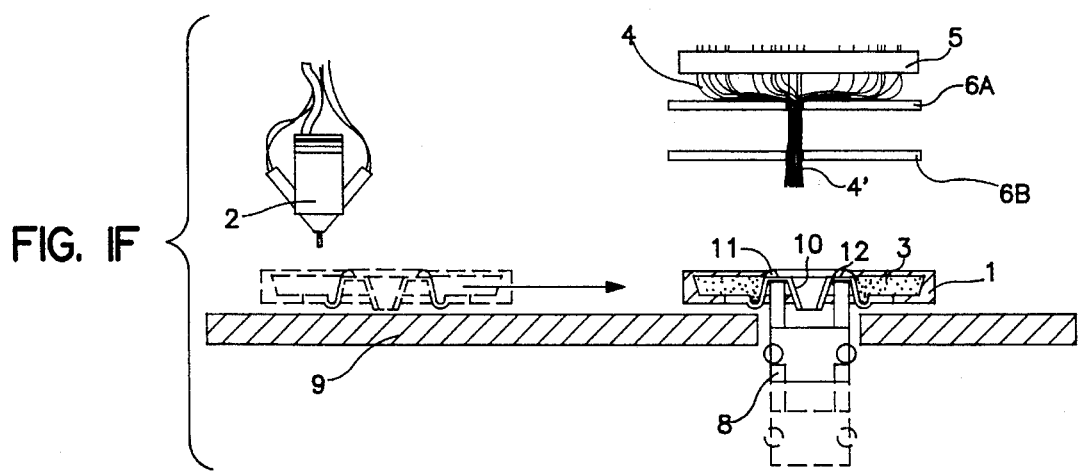
Figure 1G:
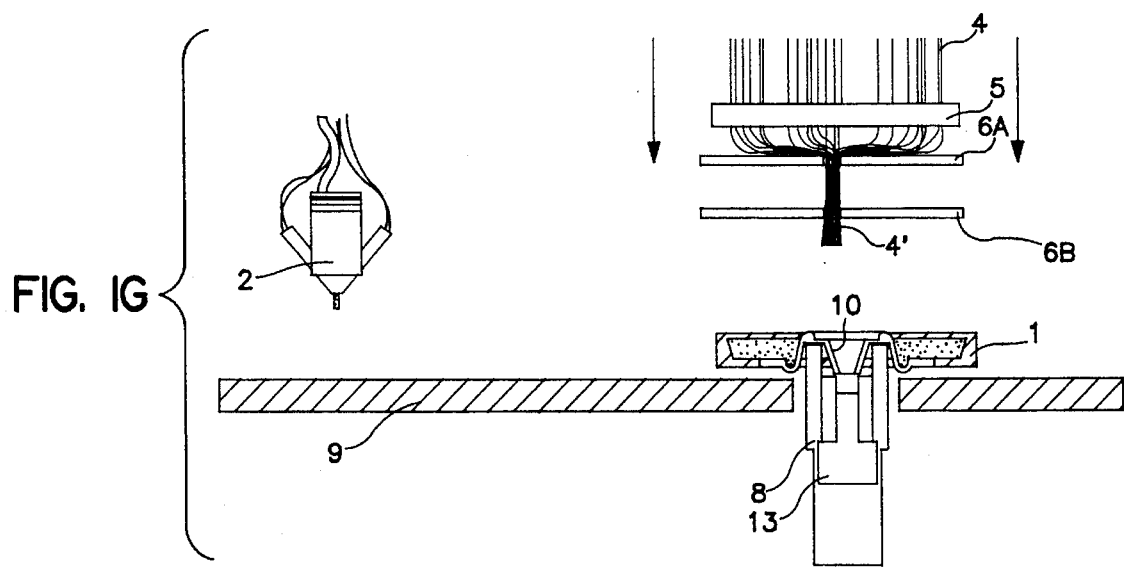
Figure 1H:
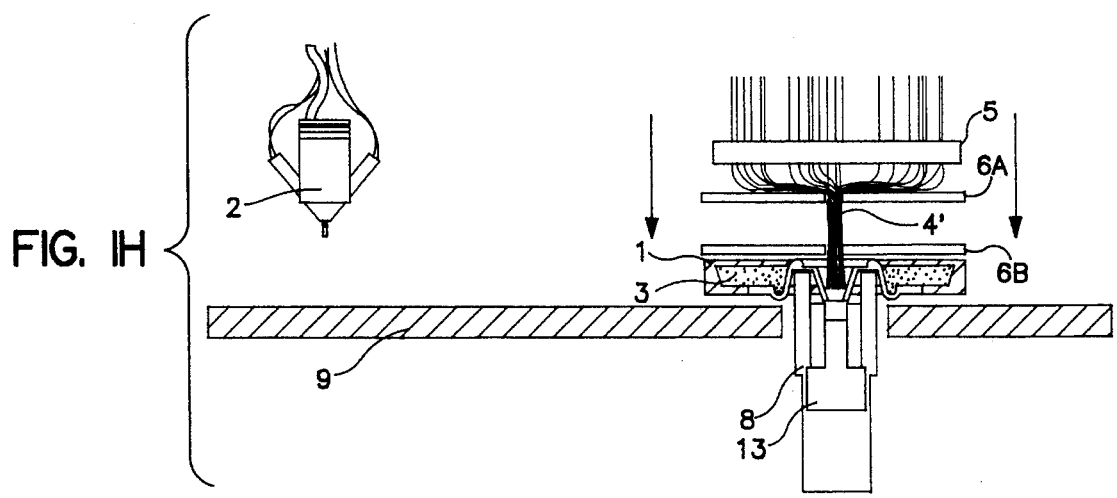
Figure 1I:
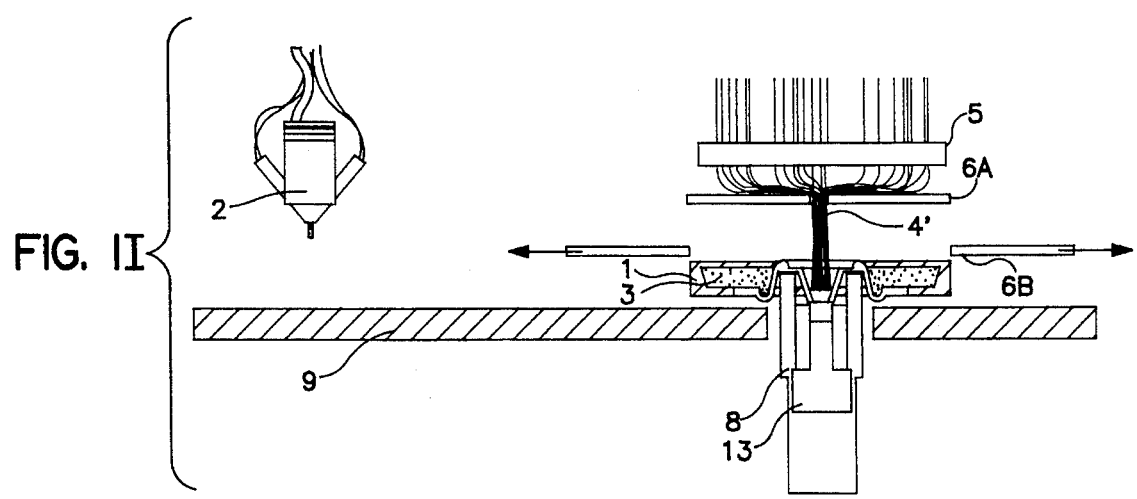
Figure 1M:
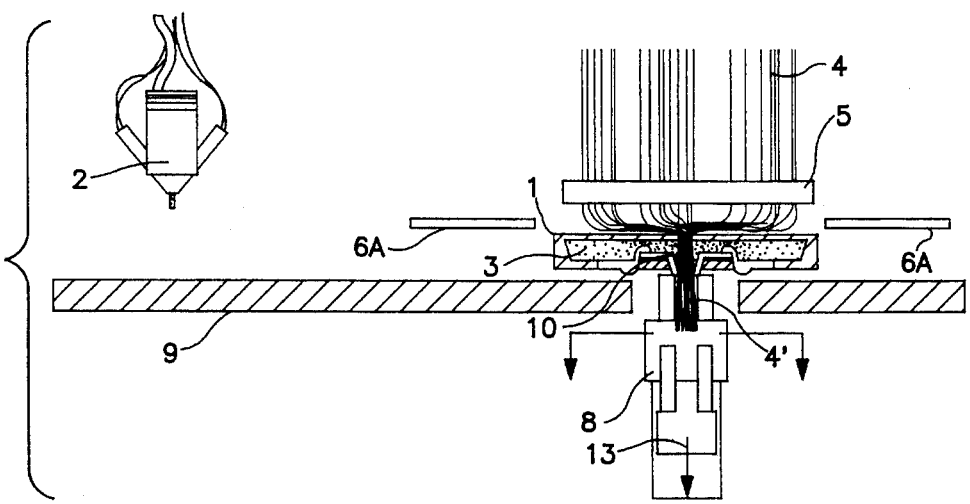
Figure 1N:
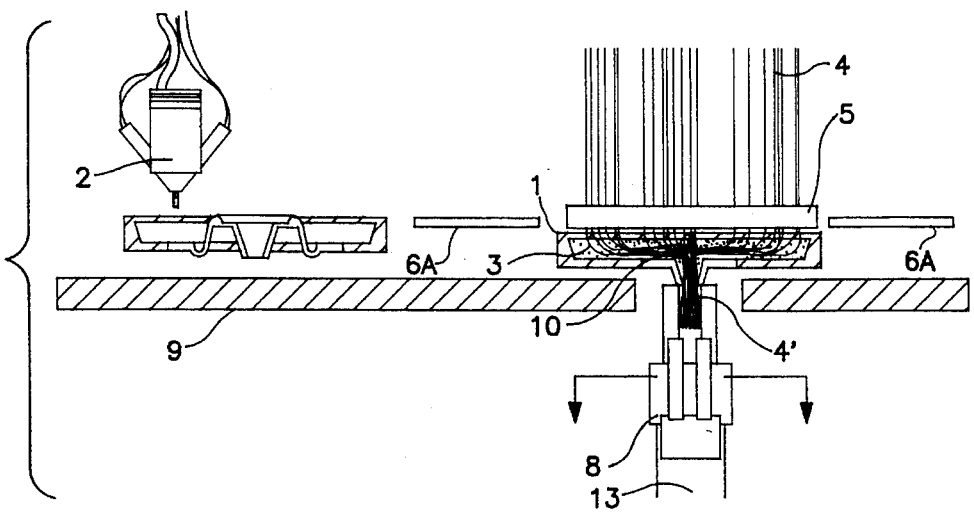
Figure 1O:
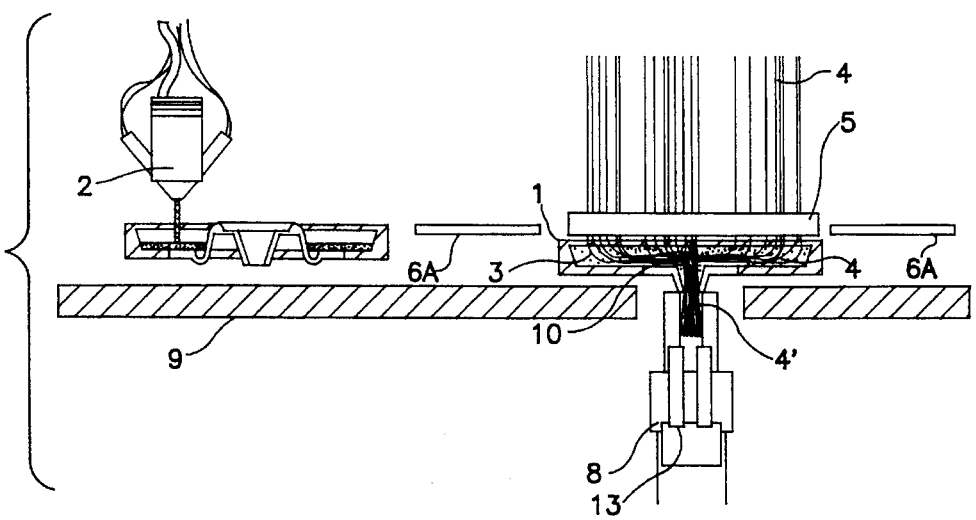
Figure 1P:
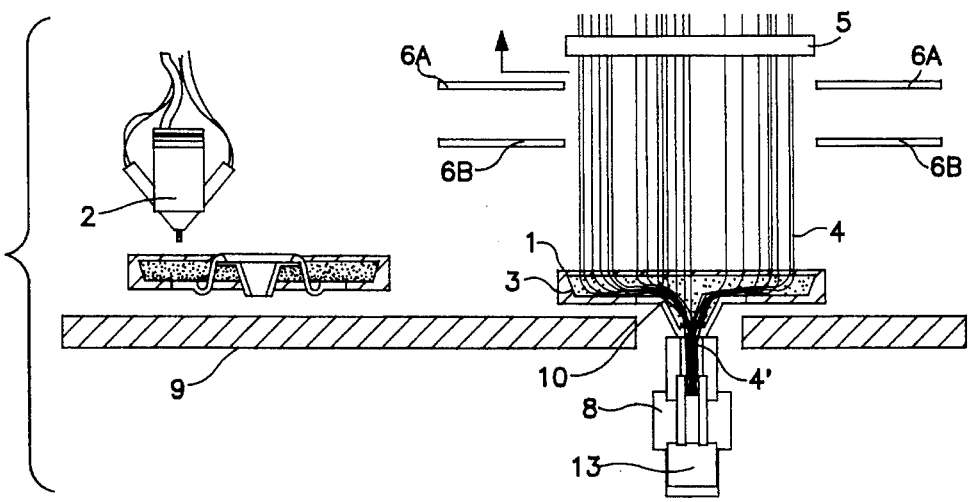
Figure 1Q:
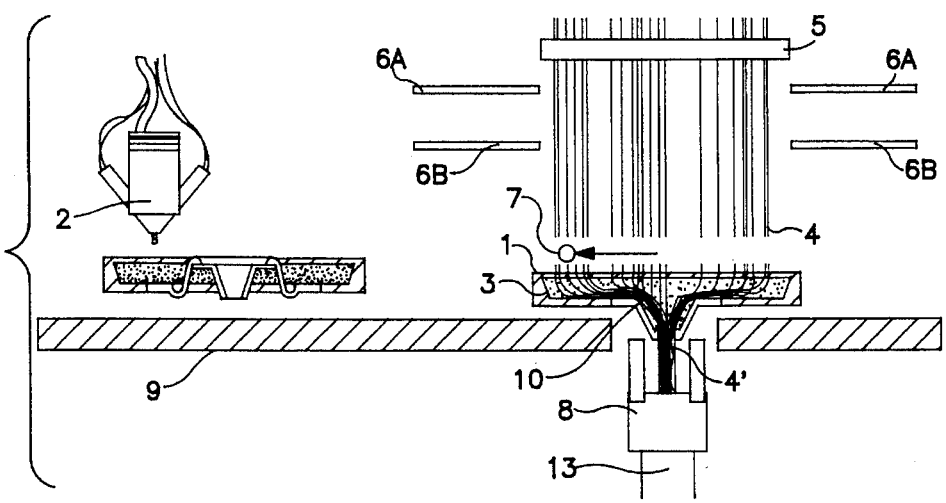
Figure 1R:
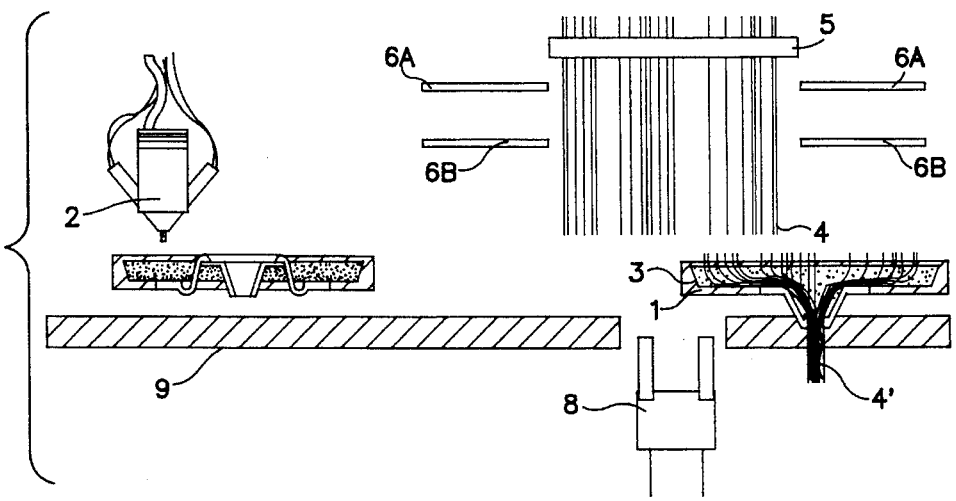

FIGS. 1A–R show diagrammatically the consecutive steps of a preferred embodiment of the method according to the invention.

FIGS. 1A, B show how a mould 1 is filled by a casting device 2 with a liquid and quickly setting plastic 3 to form the carrier for optical fibers 4 in the mould 1.

The optical fibers 4 have already been inserted through the openings (not shown) in a pattern plate 5 serving as positioning means and holding the fibers in a predetermined pattern in accordance with the desired pattern of the optical fibers 4 in the image surface. For this purpose, the pattern plate 5 may be provided with openings corresponding to said pattern. It is, however, also possible for the pattern plate 5 to have a regular distribution of openings and for the desired pattern to be obtained by inserting the fibers 4 through the pattern plate 5 in accordance with said pattern. On the other hand, an optical fiber may also be inserted through each opening in the case of a pattern plate having regularly distributed openings, only those fibers which are necessary for achieving the pattern being fed through in order to obtain the desired pattern. The positioning means may also be constructed otherwise than as single or multiple pattern plates.

FIG. 1C shows how, in a subsequent step of the method according to the invention, the fibers, which project below the pattern plate 5 are grouped by a first bundling means 6A. This bundling means 6A consists of plates which are movable like a diaphragm to and fro each other in a horizontal plane to bring the optical fibers 4 together.

FIG. 1D shows that subsequently a second bundling means 6B also brings the optical fibers 4 together at a distance from the first bundling means 6A thereby grouping the optical fibers 4 over a greater length into a proper fiber bundle 4'.

In FIG. 1E, it is shown that then the optical fibers 4 grouped by the bundling means 6A and B are cut within one plane by suitable cutting means 7, such as a hot filament. Preferably, the fibers 4 within the fiber bundle 4' are also more or less melt together thereby causing at least the ends of the optical fibers 4 to remain connected also without the bundling means 6 and preventing the end of one or more optical fibers 4 from protruding from the bundle 4'.

FIG. 1F shows that the mould 1 containing plastic 3 which is still liquid and has reached the right temperature, for example ca. 80° C., by an exothermal reaction is moved to a position under the pattern plate 5 containing the optical fibers 4. A pinching means 8 is also moved upwardly between mould displacing means 9 of the device for supporting the mould 1, such that pinchers of the pinching means 8 are arranged around an enclosure 10 for the bundle of optical fibers 4. This enclosure 10 consists of a conus-shaped sleeve being attached within an opening 12 in the base of the mould 1 by a surrounding flexible connecting ring 11 so as to be vertically movable. The enclosure 10 is, in the condition according to FIG. 1F, in the upper position in which the plastic 3 within the mould 1 is prevented from flowing out of the mould 1 through the opening 12, or through the open enclosure 10, respectively.

In FIG. 1G, the pattern plate 5 and the bundling means 6A and B are commonly moved downwardly in a direction to the mould 1 and a bundle gripper 13 of the device is moved to a position under the enclosure 10 of the mould 1. Simultaneously with moving the pattern plate 5 downwardly, the fibers 4 are supplied from above, so that the fibers are not under tension and no undesired relative fiber movements take place as a result of tension forces.

In FIGS. 1H and I, it is shown that the pattern plate 5 and the bundling means 6A, B are moved downwardly to such an extent that the lower portion of the fiber bundle 4' is introduced into the enclosure 10 and the lower bundling means 6B has reached the mould 1 so that this bundling means 6B should first be moved laterally away from each other before the pattern plate 5 with the fiber bundle 4' could be moved further downwardly.

In FIG. 1J, the pattern plate 5 together with the bundling means 6A are moved further downwardly to such an extent that the fiber bundle 4' projects through the enclosure 10 and the lower portion of the fiber bundle 4' may be gripped by the fiber gripper 13 so that the fiber bundle 4' may be guided further through the enclosure 10.

When, according to FIGS. 1K and L, the pattern plate 5 is moved so much further that also the upper bundling means 6A has reached the mould 1 and is moved outwardly, the pinching means 8 is closed to pinch the enclosure 10 sealingly around the fiber bundle 4'.

FIG. 1M shows that from the moment the enclosure 10 is moved by the pinching means 8 synchronized with the pattern plate 5 and the fiber gripper 13 downwardly, the upper side of the enclosure 10 comes below the level of the plastic 3 and the plastic 3 may hence flow into the enclosure 10 and into a portion of the enclosure 10 around the fiber bundle 4'.

In FIG. 1N, the pattern plate 5 has reached its bottom position at a small distance above the level of the plastic 3 within the mould 1 (for example 2 mm above the level of the plastic 3), in which the optical fibers 4 below the pattern plate 5 are almost completely immersed in the plastic 3 and due to the heat of the plastic soften somewhat, whereas, if the pattern plate 5 is at a sufficiently small distance from the plastic in the mould 1, the optical fibers 4 immersing from the plastic and directed towards the pattern plate 5 will after some time assume an essentially perpendicular orientation with respect to the level of the plastic, determined by the openings in the pattern plate, in which position the plastic 3 subsequently sets. It is noted that the openings in the pattern plate 5 are sufficiently wide to allow a low resistant passage of the fibers 4 on the one hand, and guide the fibers 4 sufficiently to accurately position and orientate the fibers on the otherhand.

During the setting operation of the plastic 3 in the mould 1, or sooner if desired, another mould 1 for the next light panel may already be filled with the plastic 3 by the casting device 2, so that this plastic 3 is allowed to come to the right temperature and is ready for use when the preceding mould 1 is discharged (FIG. 10).

In FIG. 1P, the pattern plate 5 is raised and returned to the original position thereof after the plastic 3 in the mould 1 has set sufficiently, in order to be ready for the next light panel.

The optical fibers 4 are then cut using the cutting means 7, or possibly separate cutting means, near the plastic carrier. For this purpose, the cutting means may for example consist of a laser apparatus, a heated ultrasonic vibrating knife, or simply hot filament. When cutting is performed with heat there is automatically formed a lens cap on the end of the optical fibers 4. The fibers 4 are under tension when they are cut in order to guarantee that the fibers are cut perpendicularly. Then, both the fiber gripper 13 and the pinching means 8 are opened and, in accordance with FIG. 1R, the mould 1 with the carrier for the light panel formed therein may be removed in order to make place for the next mould 1. As shown, a first part of the fiber bundle is surrounded by a part protruding from the carrier and formed within the enclosure 10. The carrier may then be removed from the mould 1 and be further worked into a finished light panel.

In summary, the method described above is as follows. First of all, the fibers inserted through the pattern plate 5 are bundled there below. These fibers 4 are not placed in tension, since to do so would disorient the fibers with respect to the way they are intended to be located in the sign. Following this, the fibers are supplied from above at the same time that the bundling means are moved downwardly to further insure that the fibers are not placed under tension. The untensioned fibers are then disposed in the plastic and the positioning plate is located adjacent the surface of the carrier material in order to insure that the ends of the fibers extending outwardly from the carrier material are in a generally perpendicular position. Once the plastic has set, the fibers are placed under tension so that the fibers are cut substantially perpendicularly.

As mentioned earlier, foamed plastic may be used to form the carrier. In this case the pattern plate 5 or a separate means should be used as a cover to prevent foam from spilling over and to create a top surface of the carrier with a desired configuration. To prevent the fibers from floating to the top surface due to the foaming plastic use can be made of a down-holder or the mould can be placed in an upside-down position. It is also possible to make the carrier in two layers. First, the cover is placed in a lower position when the foamed plastic is introduced and set, thereby keeping the fibers down. Then the cover is lifted and a thin top layer of non-foaming plastic is formed on the set foamed plastic.

FIGS. 2A–L show that, in accordance with an alternative embodiment of the method described above, the fibers are not guided through a hole in the base of the mould 1, but are guided through or over a side wall of the mould so that the fibers exit from the side of the light panel in a bundled or unbundled way. When the optical fibers 4 are guided from the mould 1 in this manner, one should pay attention to the fact that the fibers 4 should be urged downwardly near the place of exit from the mould, for example by having a low positioned opening or by using a separate down-holder so that the fibers 4 are prevented from floating on the plastic 3 and from not being immersed properly in the plastic 3. The opening in the side wall of the mould 1 may also be provided with an enclosure which is movable in vertical direction, or the fibers 4 may be sealingly passed through the side wall of the mould in another way. In the embodiment shown the fiber bundle 4' is sealingly guided through an opening in a vertically movable side wall of the mould 1. In the embodiment shown, the fiber bundle 4' is sealingly guided through an opening in a vertically movable side wall of the mould 1. A possible exemplary embodiment of this method is now explained with reference to FIGS. 2A–L.

FIG. 2A again shows the mould 1, the casting device 2, the optical fibers 4, the pattern plate 5 and bundling means 6A and 6B. In this exemplary embodiment, these bundling means 6A and 6B are arranged vertically and are movable in vertical direction to form a bundle. In order to get the vertically suspended fibers between the parts of the bundling means 6A and 6B there is added a deflection means 22 which is movable horizontally and adapted to deflect the ends of the fibers 4 towards the bundling means 6A and 6B.

Figure 2A:
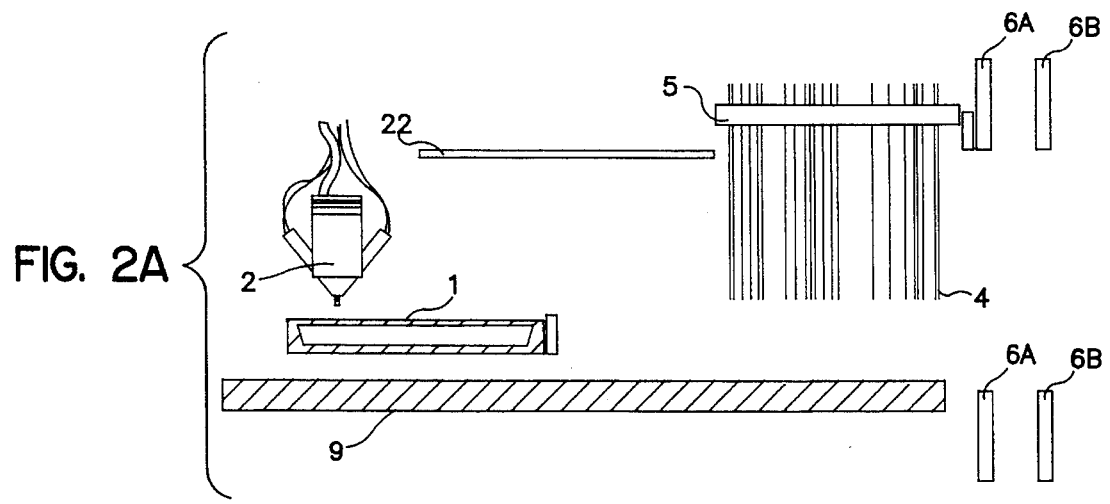
FIGS. 2A–L show diagrammatically another embodiment of the method according to the invention.
Figure 2B:
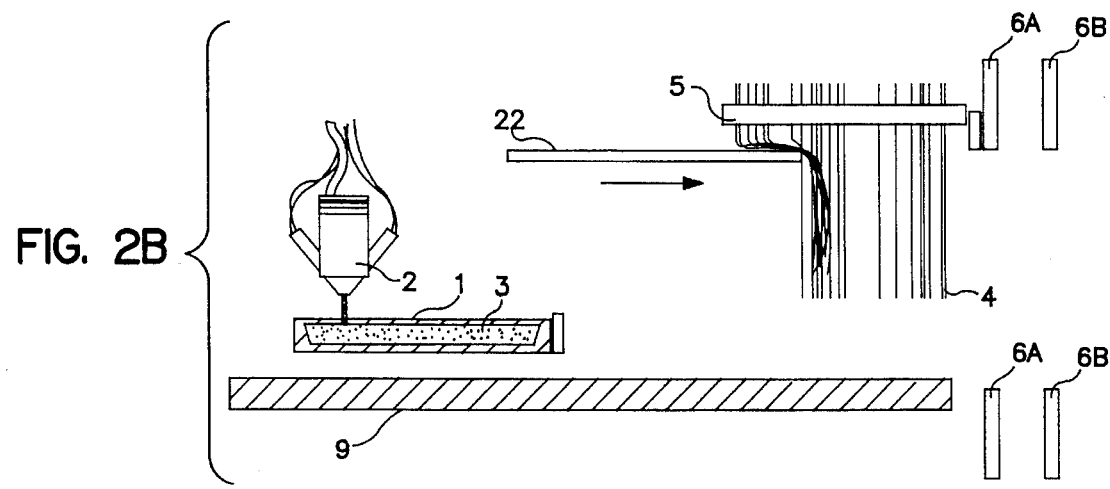
Figure 2C:
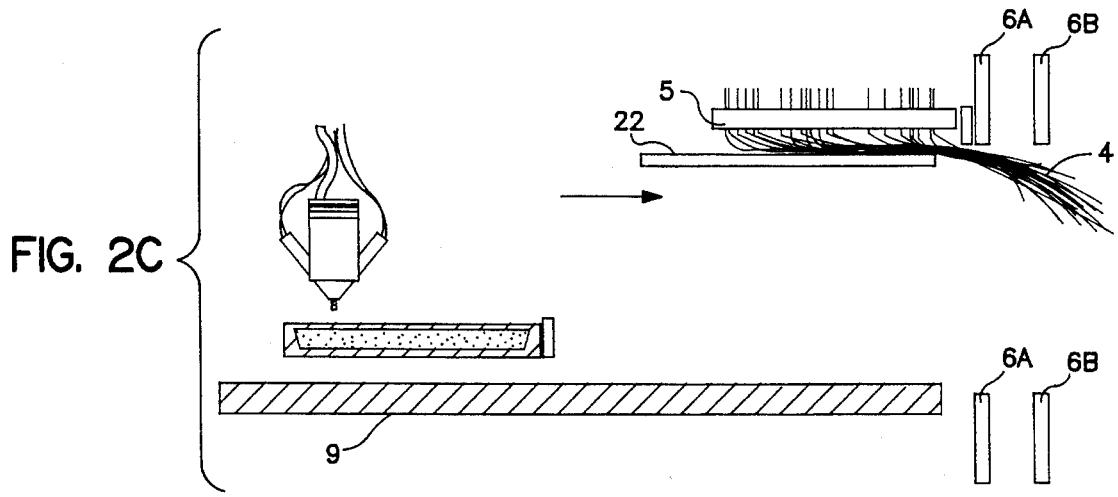

FIGS. 2B and 2C illustrate the deflection of the ends of the fibers 4 by the deflection means 22, while the mould 1 is filled with plastic 3.

Figure 2D:
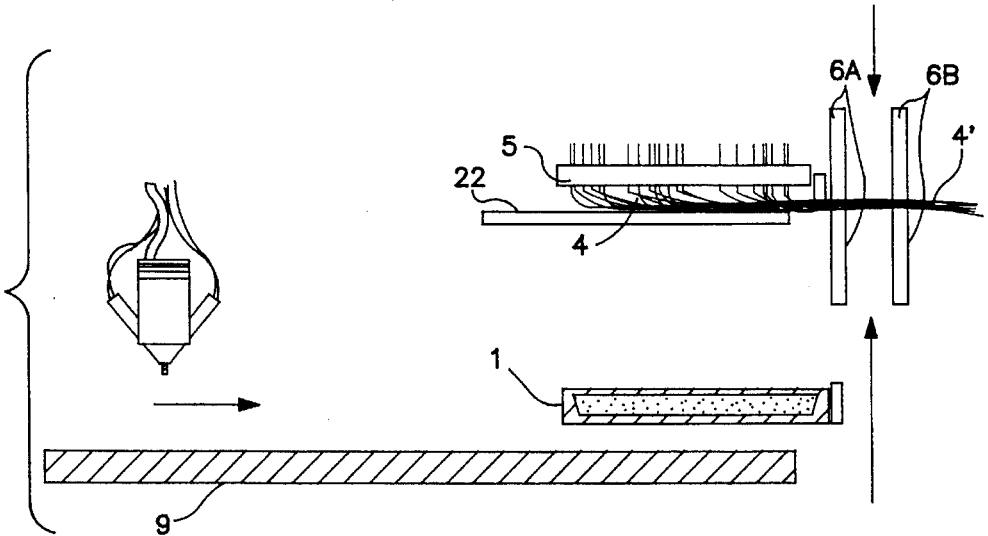

In FIG. 2D, the bundling means 6A and 6B are closed and there is formed a laterally projecting bundle 4'. The mould 1 filled with plastic 3 is now arranged under the pattern plate 5.

Figure 2E:
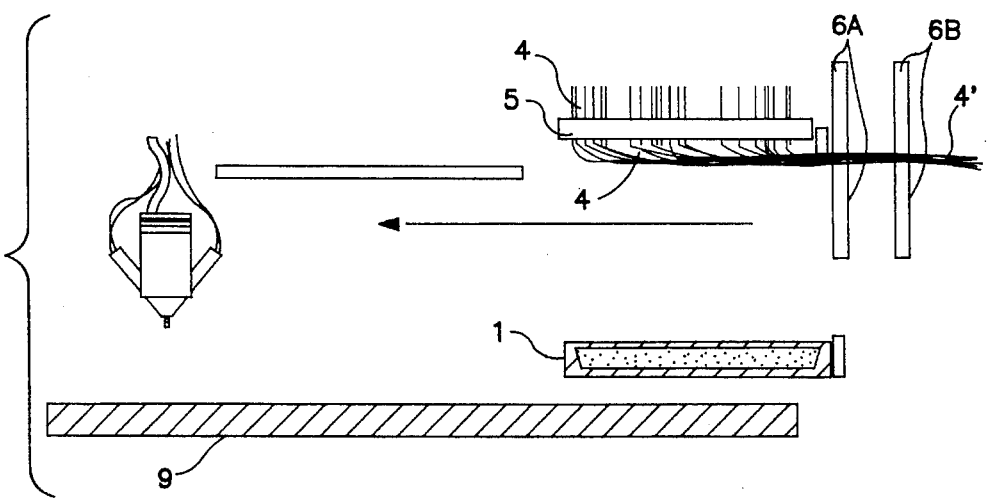
Figure 2F:
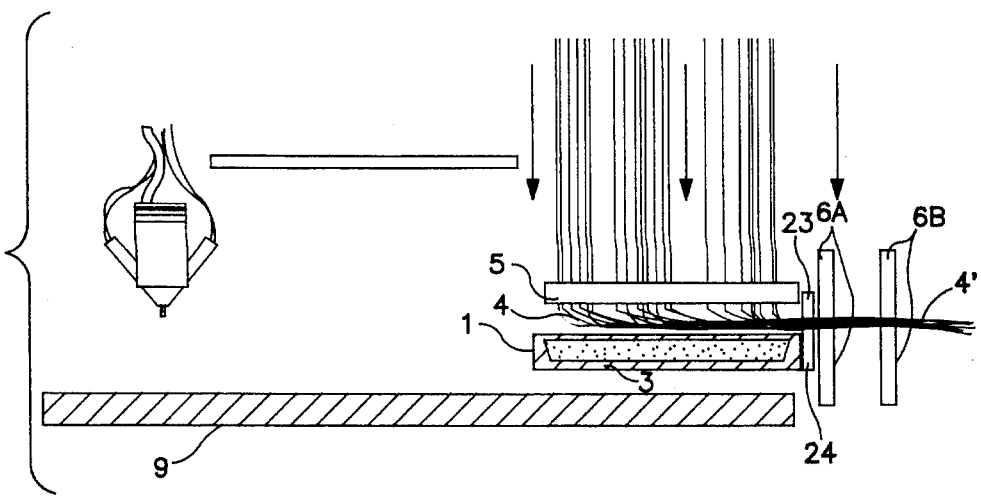

In FIG. 2E, the deflection means 22 is moved back to its initial position, whereafter according to FIG. 2F the pattern plate 5 together with the fibers 4 and the bundling means 6 are moved downwardly towards the mould 1. There it is shown that an upper sealing part 23 is moved together with the pattern plate 5 and, in FIG. 2E, it is abutted against a lower sealing part 24, said sealing parts 23 and 24 come to lie sealingly around the fiber bundle 4'. The sealing parts 23 and 24 form a side wall of the mould 1 which is movable in vertical direction.

Figure 2G:
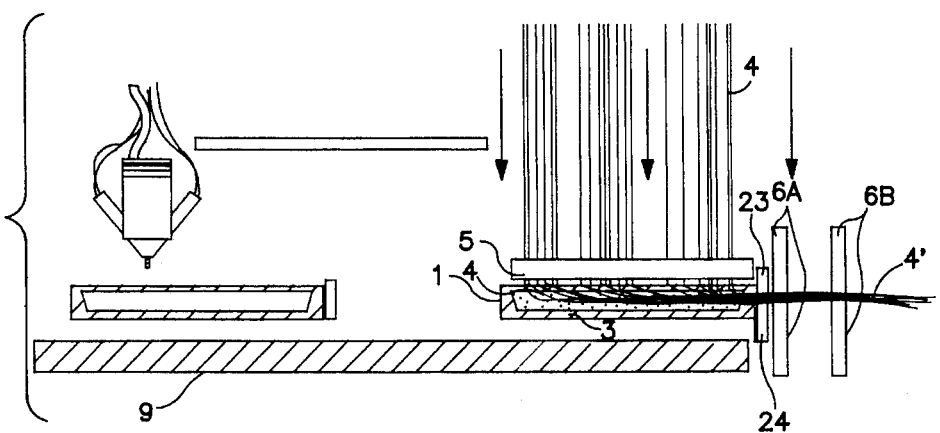
Figure 2H:
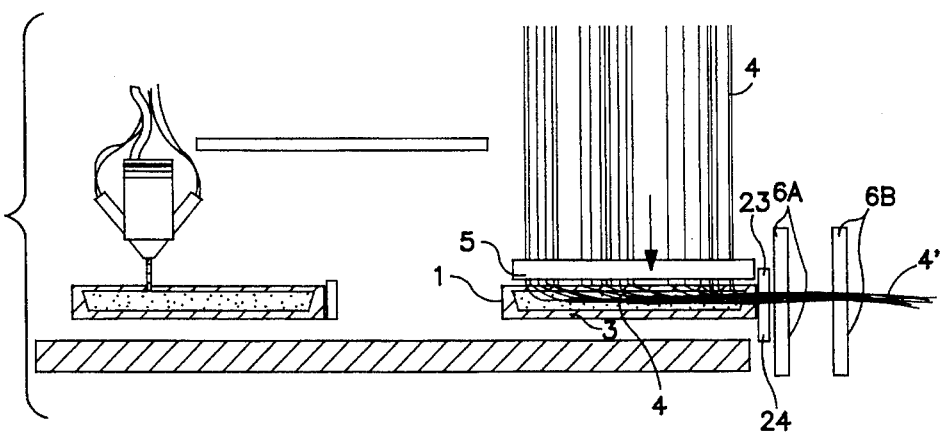

In FIG. 2G, the fibers 4 are moved into the plastic in the mould 1 due to the displacement of the pattern plate 5, the bundling means 6 and the sealing parts 23, 24 and in FIG. 2H the end position is obtained in which the plastic 3 is allowed to set.

Figure 2I:
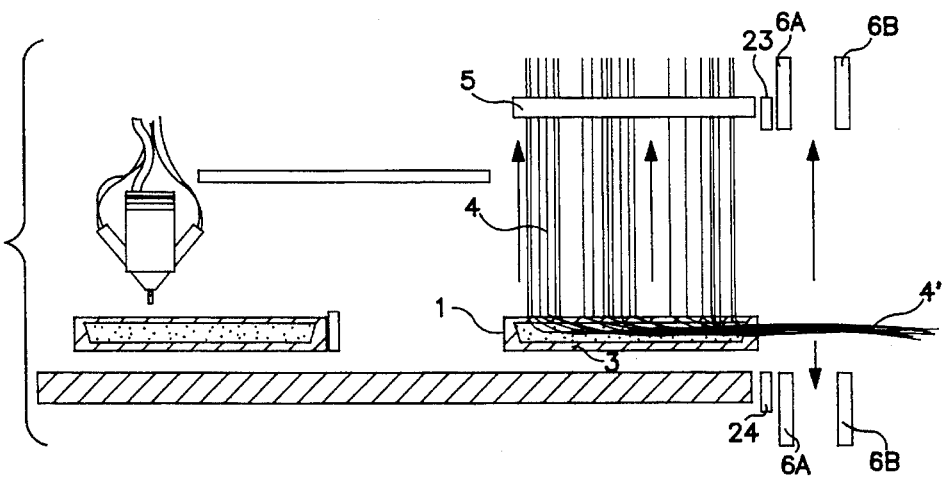
Figure 2J:
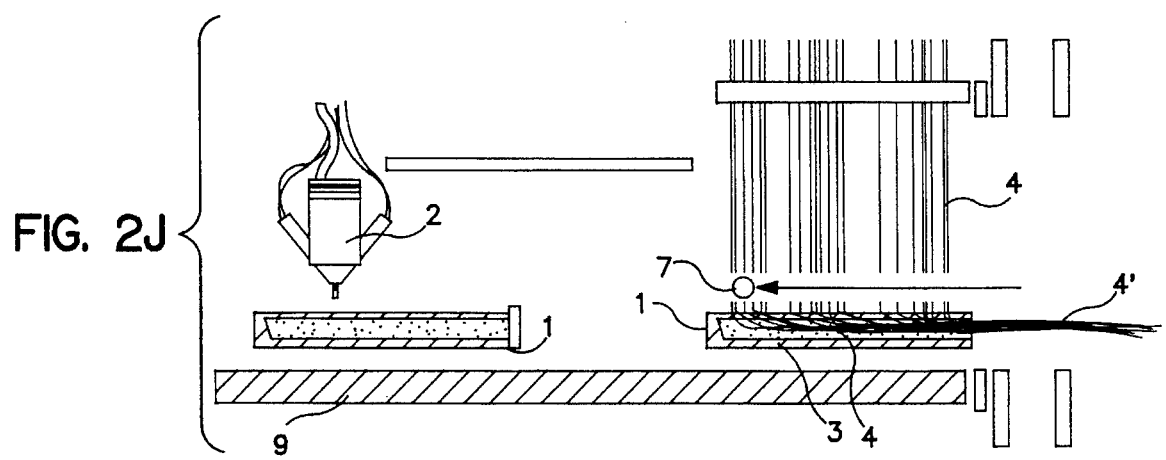

In FIG. 2I, the pattern plate 5, the bundling means 6 and the sealing parts 23, 24 are moved back to their initial position and the fibers 4 are kept under tension in order to be cut in accordance with FIG. 2J.

Figure 2K:
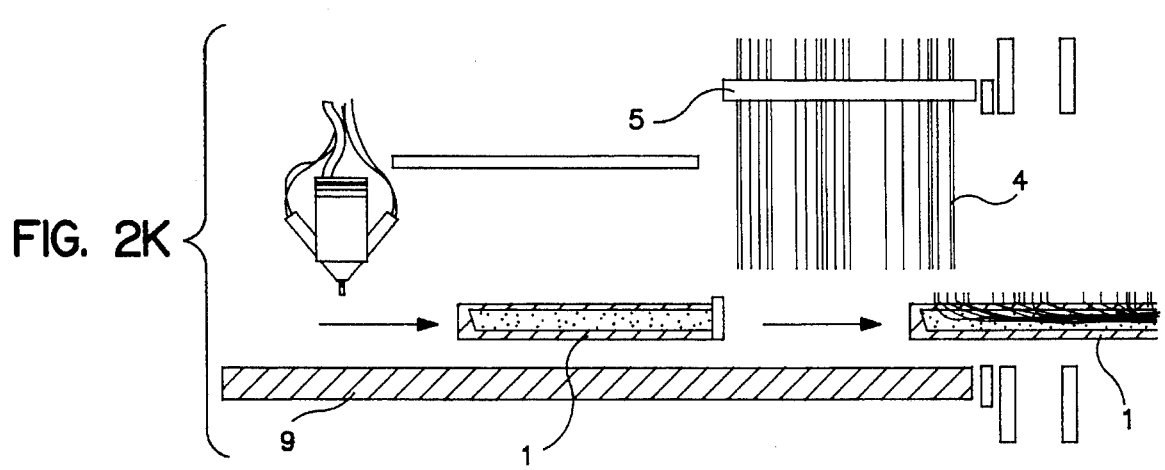

FIG. 2K illustrates the discharge of the mould 1 with the carrier formed therein and a new mould 1 is supplied for the next cycle.

Figure 2L:
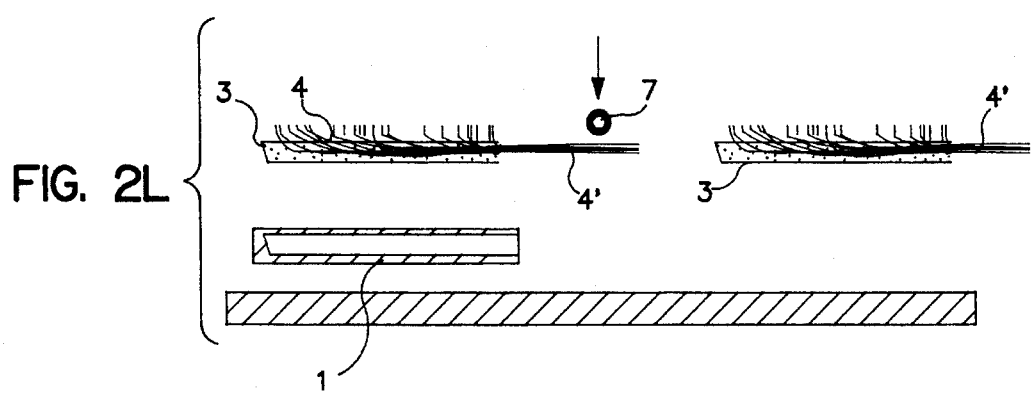

According to FIG. 2L the set carrier is removed from the mould 1 and the fiber bundle 4' is cut perpendicularly by cutting means 7.

FIGS. 3A–L illustrate another alternative embodiment of the method described above, which is used to obtain selected groups of fibers within the light panel. This is for example useful if different optical fibers 4 in the light panel are to emit different colours and/or are not all to light up simultaneously. For this purpose, the apparatus for carrying out the method includes a number of supply means 31 corresponding to the desired number of fiber groups, in this case three supply means 31A, 31B and 31C. Each supply means 31 may for instance comprise a rotary bar 32 having circumferential grooves for the involved fibers 4 guided around it, said fibers being supplied from reels and through flexible tubes 33 and a comb 34. Each supply means 31 also includes guide rollers 35 having a high friction surface and being permitted to rotate in one direction only, i.e. in a direction allowing the fibers 4 to move downward relative to the supply means 31. Finally, the supply means 31 include an adjustable clamping member 36. Behind the clamping member 36 in a downstream direction, the fibers 4 extend to their position in the pattern plate 5. The supply means 31 are movable independently of each other.

Figure 3A:
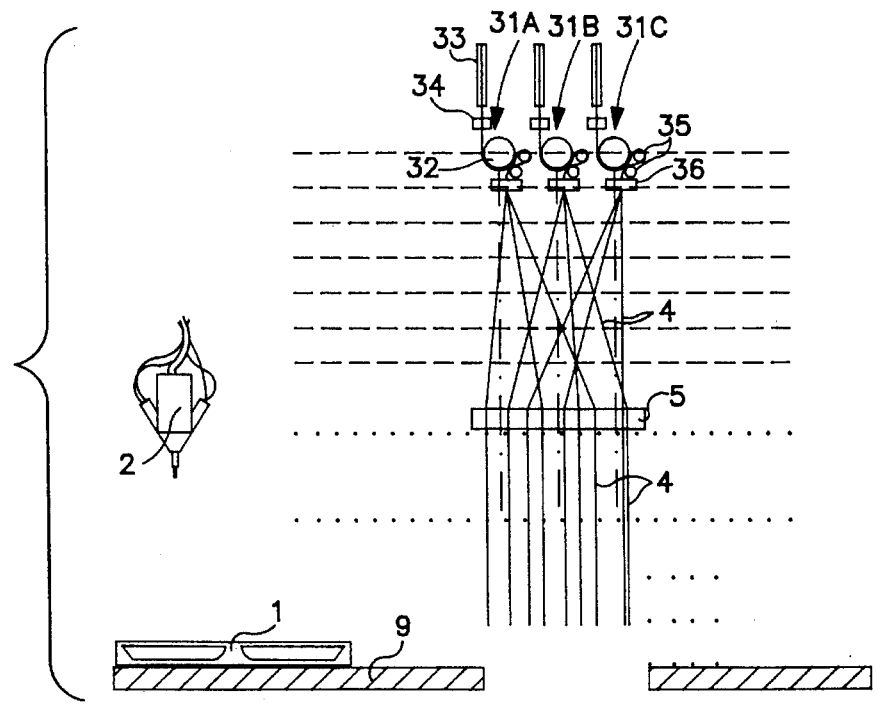
FIGS. 3A–L show diagrammatically still another embodiment of the method according to the invention.

In FIG. 3A, the apparatus is in its starting position with the supply means 31 and the pattern plate 5 in their upper positions.

Figure 3B:
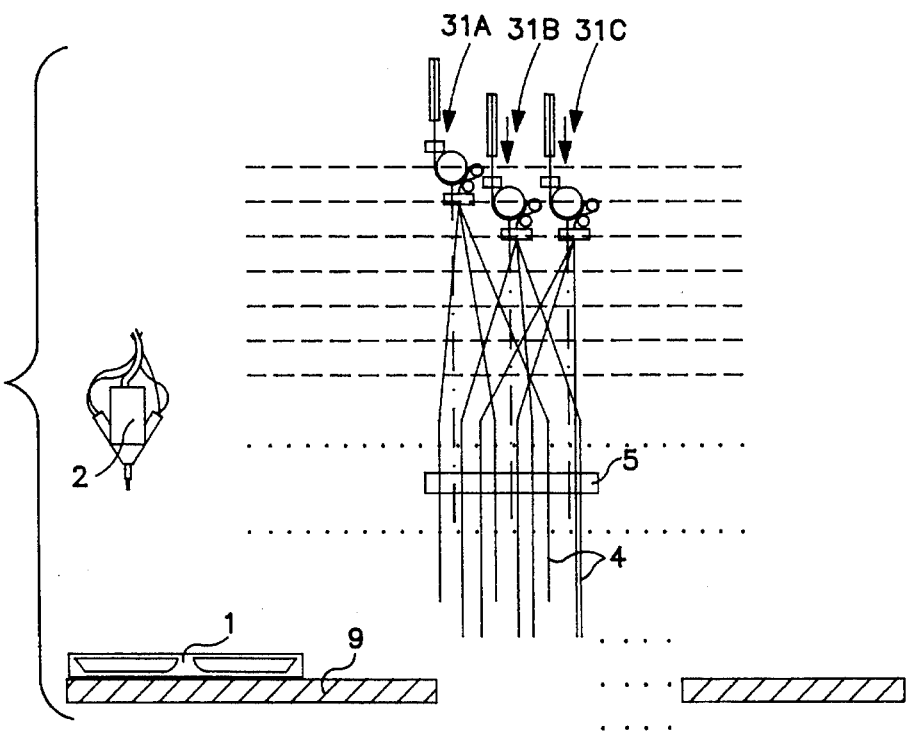

FIG. 3B shows that the two supply means 31, C move downward together with the pattern plate 5, while the left supply means 31A remains stationary. The fibers 4 of the progressing supply means 31B, C move downward with them.

Figure 3C:
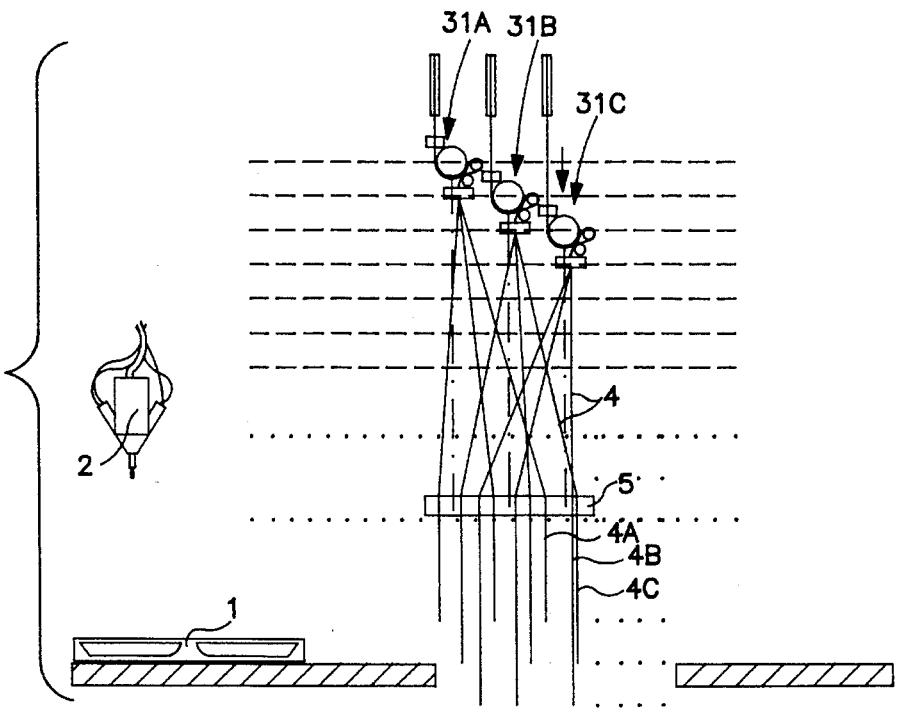

In FIG. 3C, the middle supply means 31B has stopped at a certain level and the right supply means 31C has moved further downwardly so that eventually the three supply means 31A, B, C are at three different levels and the respective fibers 4A, 4B, 4C of the three different groups extend to three different levels also, as is clearly shown.

Figure 3D:
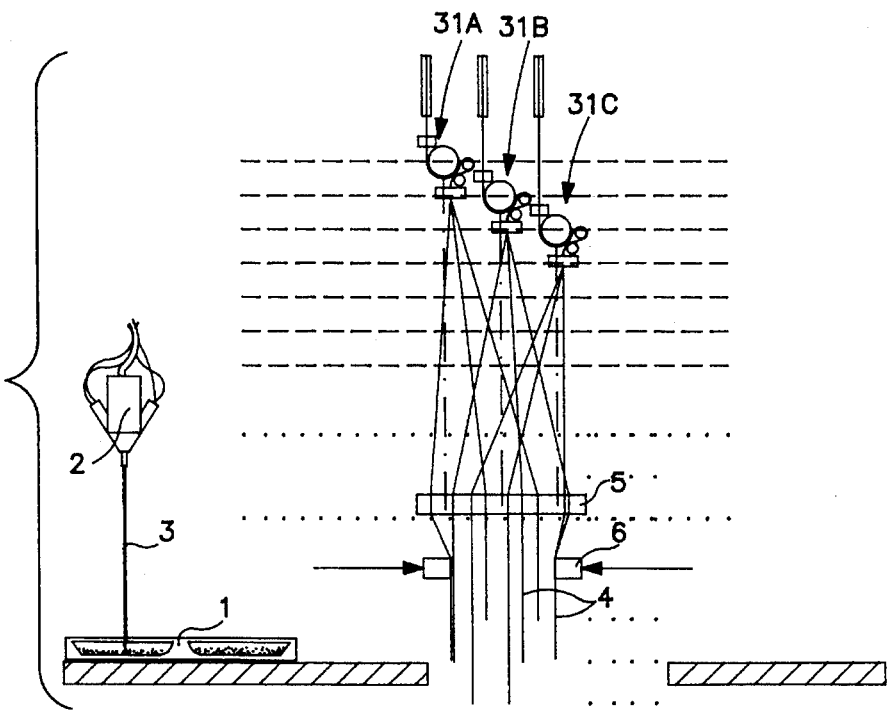

FIG. 3D illustrates the filling operation of the mould 1 and the bundling operation of the fibers 4 by means of the bundling means 6.

Figure 3E:
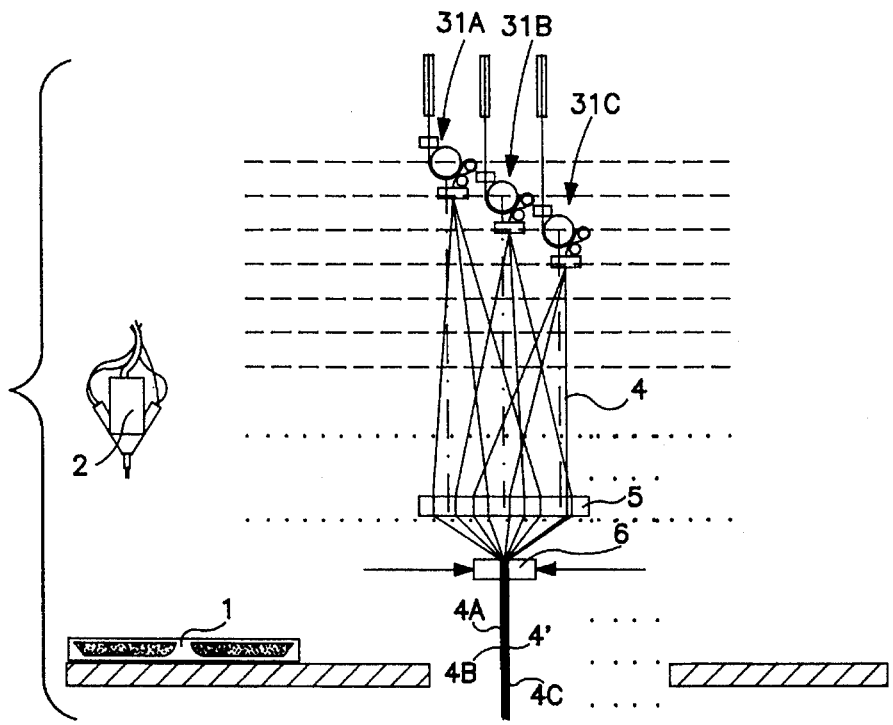

In FIG. 3E, the mould 1 is filled with the liquid plastic 3 and the bundling means 6 is closed. The fiber bundle 4' includes three groups of fibers 4A, B, C having different lengths which are easy to separate.

Figure 3F:
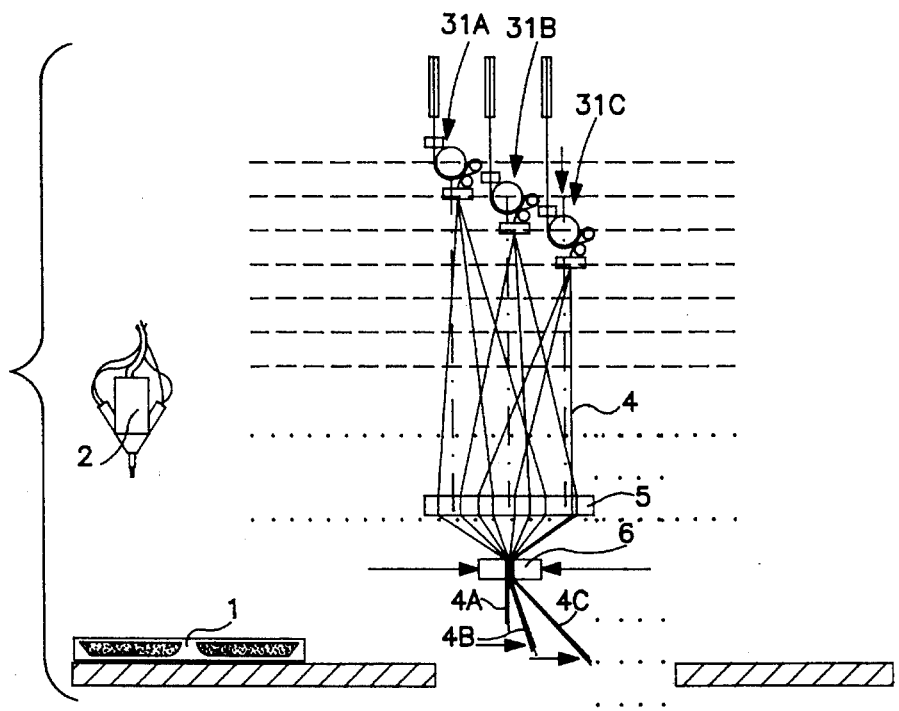

FIG. 3F shows the separation of the fiber groups 4A, 4B and 4C which may then be kept together, for example by means of an elastic band. Of course, there is also a slight difference of length within a group depending on the distance of a fiber 4 within the pattern plate 5 from the middle of the bundling means 6. This difference of length of the fibers 4 within the group may or may not be equalized in a separate bundling step or in the present step.

Figure 3G:
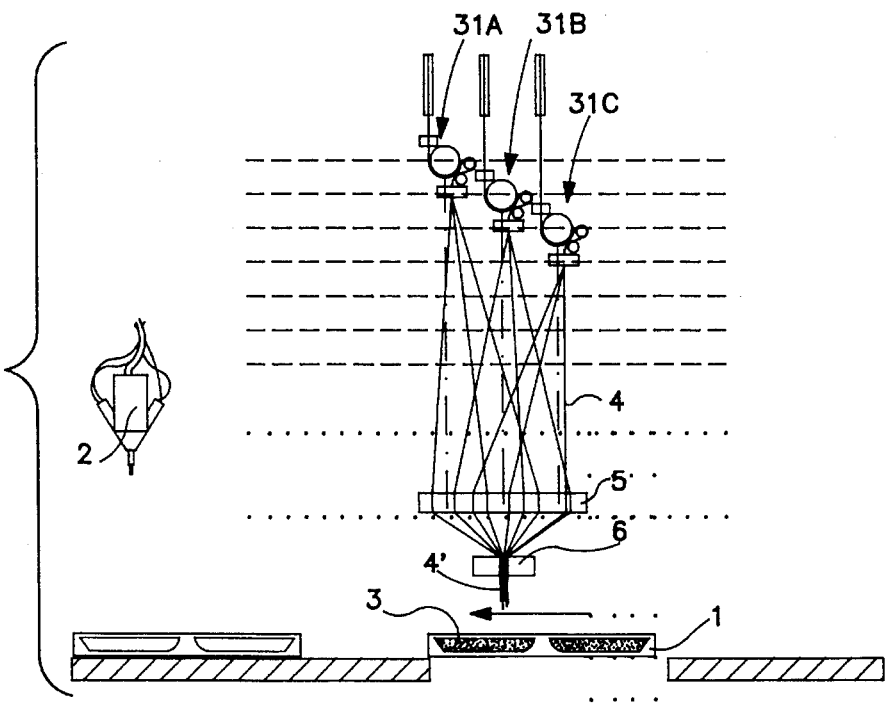

In FIG. 3G, all fibers 4 are cut to one length, of course below a point where the different groups are kept together. The mould 1 has been moved under the pattern plate 5.

Figure 3H:
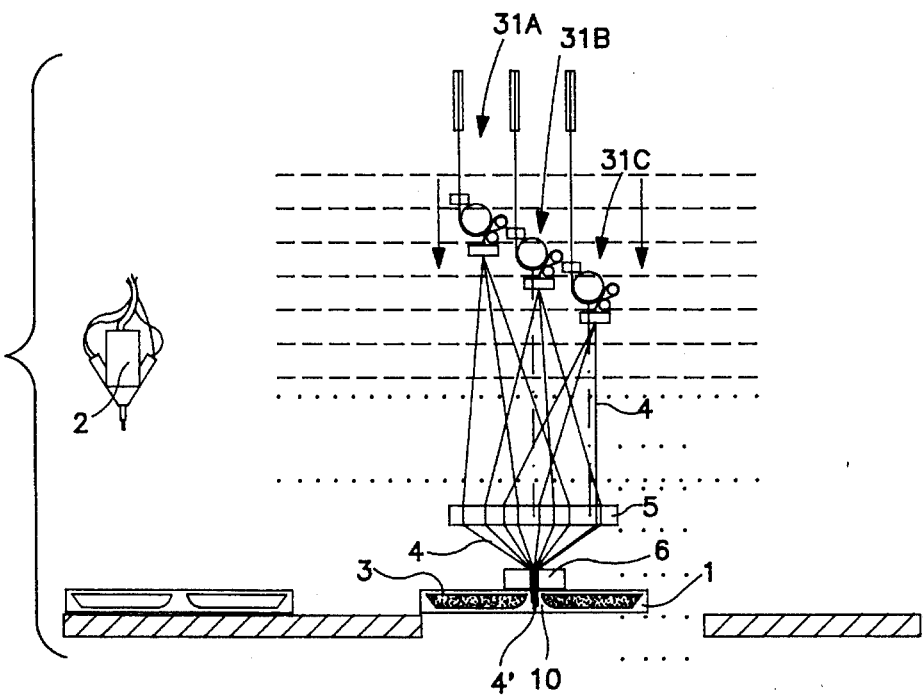

FIG. 3H illustrates that the supply means 31, the pattern plate 5 and the bundling means 6 move downwardly in a synchronized manner and the lower portion of the fiber bundle 4' is introduced into the enclosure 10. The bundling means 6 may now be removed.

Figure 3I:
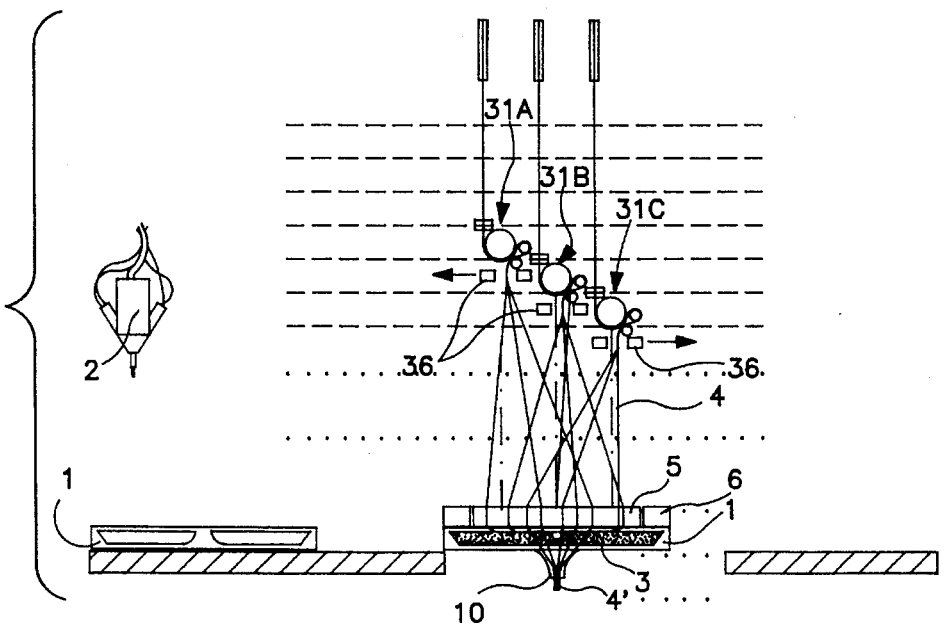

In FIG. 3I, the supply means 31 and the pattern plate 5 have been moved to their lower position in which the fibers 4 are in their end position within the plastic 3 to form the panel. In this position the plastic 3 is allowed to set. The clamping members 36 of the supply means 31 are then opened, so as to allow the supply means 31 to move upwardly relative to respective fibers 4.

Figure 3J:
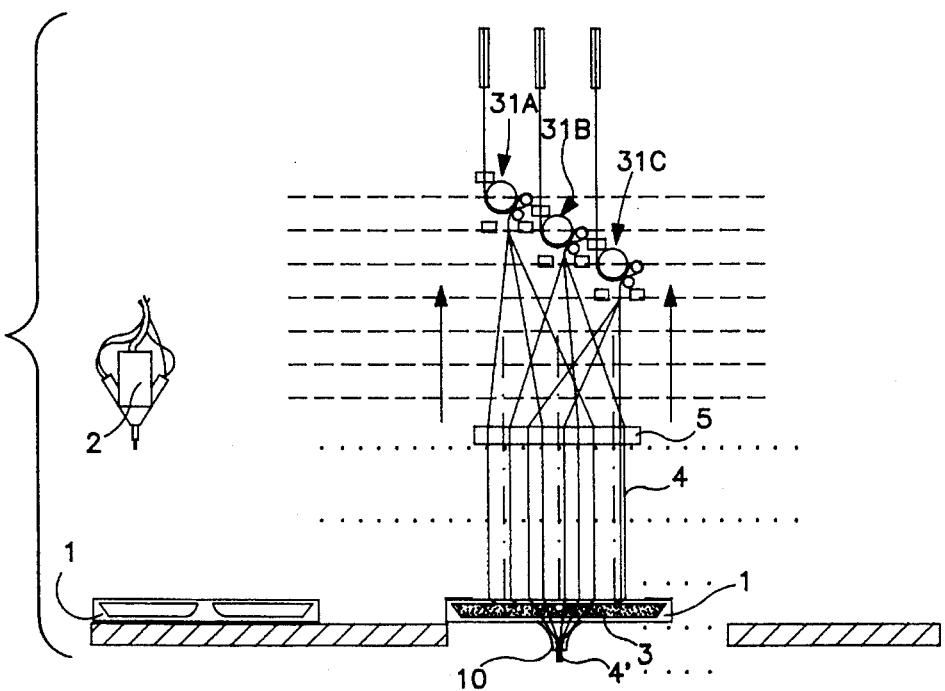

In FIG. 3J the plastic 3 has set sufficiently to permit the pattern plate 5 to move away to the upper position. Also the supply means 31 move to their upper position and in FIG. 3J they pass their position corresponding to that of FIG. 3C and beyond this intermediate position, the former and different displacements of the supply means 31A, B, C and fibers 4 to obtain different fiber lengths are neutralized again.

Figure 3K:
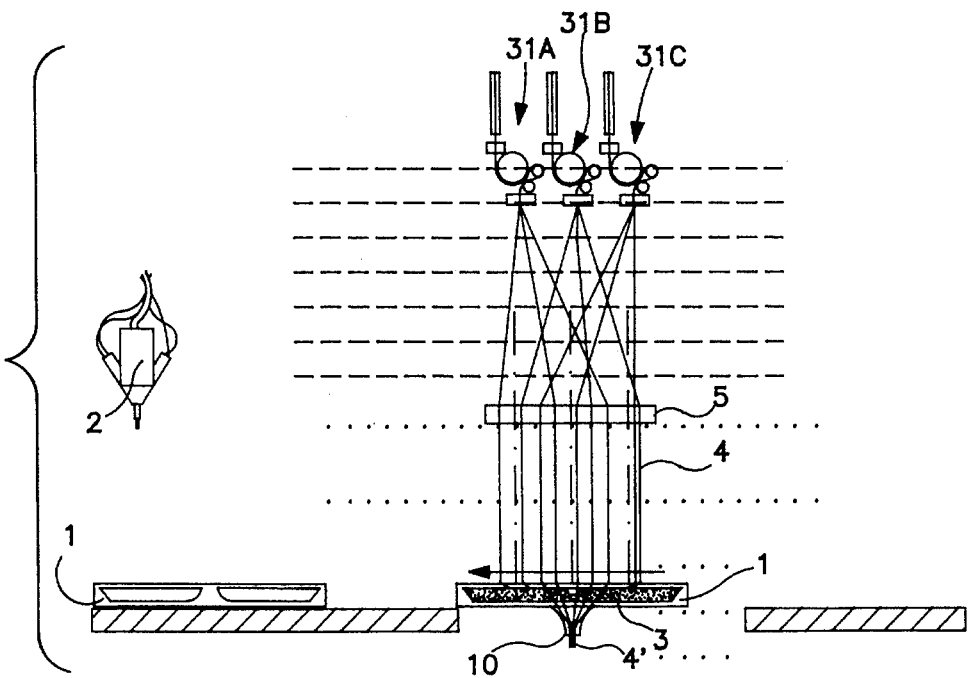

In FIG. 3K the pattern plate and the supply means 31 have reached their upper position and the fibers 4 are cut off adjacent the plastic 3 of the light panel.

Figure 3L:
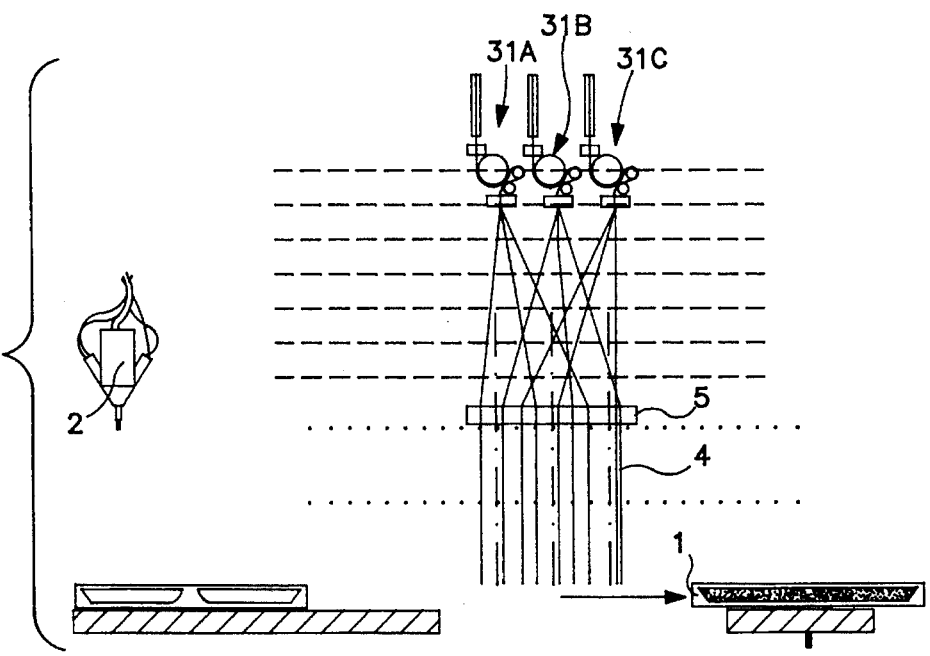

In FIG. 3L the mould 1 with the plastic 3 and fibers 4 is moved away and the apparatus is now back in its starting position according to FIG. 3A, in which the next cycle may begin.

Figure 4:
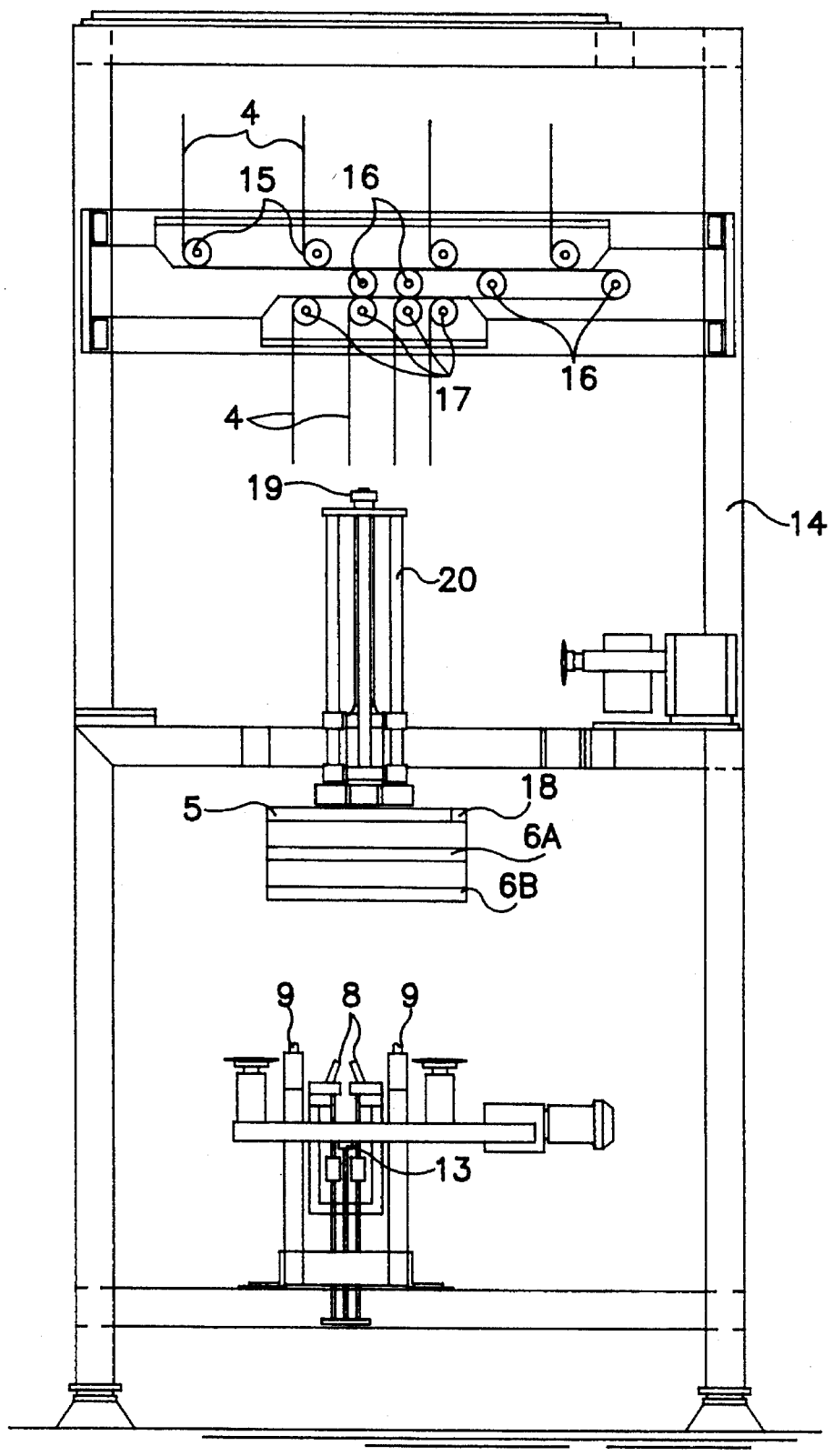
FIG. 4 is a schematic front view of a device for carrying out the method according to the invention.
Figure 5:
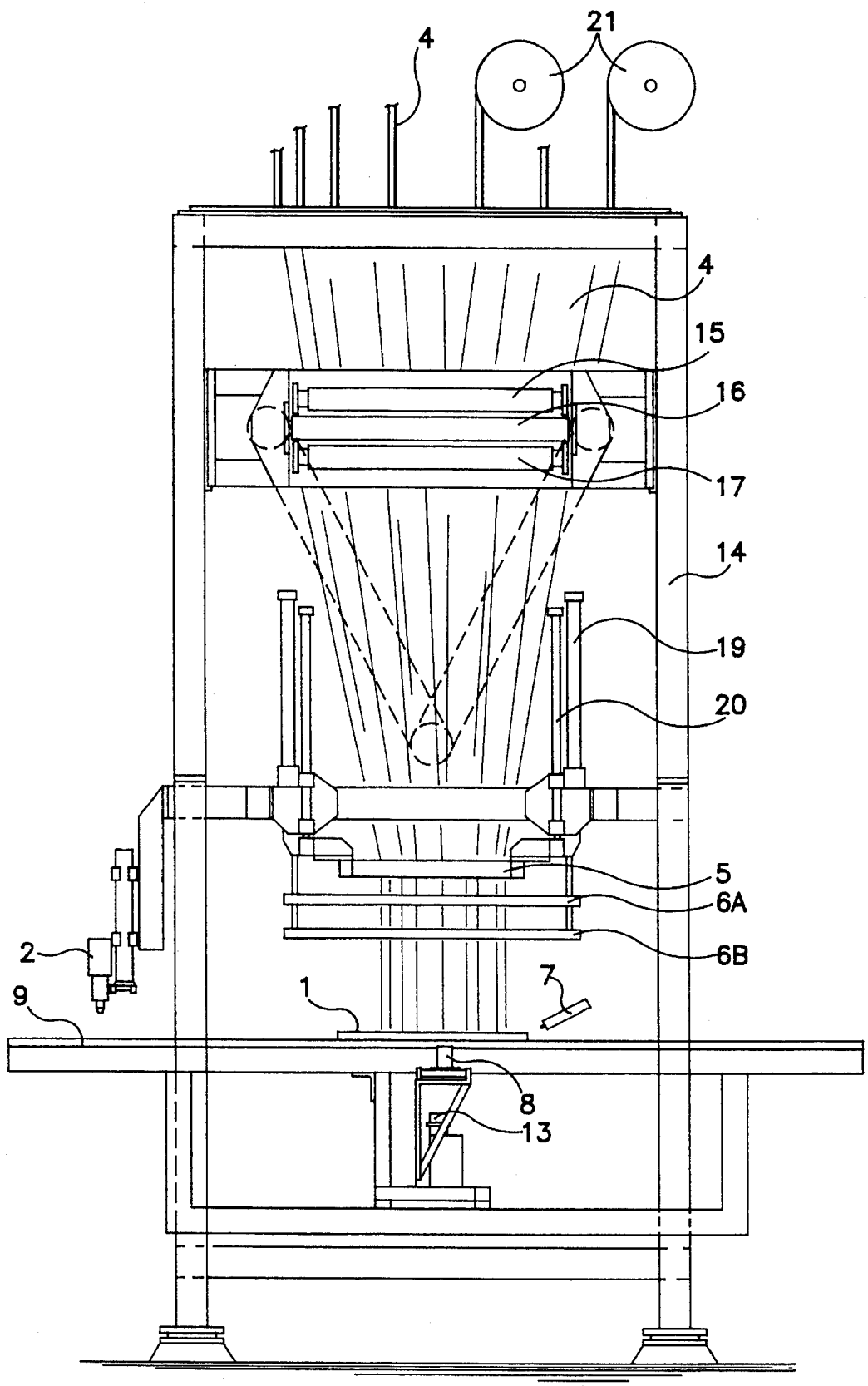
FIG. 5 is a side view of the device of FIG. 3.

FIGS. 4 and 5 schematically show an exemplary embodiment of a device in which the method of FIG. 1 may be performed. There are shown the casting device 2, the bundling means 6, the pinching means 8, the mould displacement means 9 and the fiber gripper 13. These parts are mounted to a frame 14 adapted to be placed on the ground. The optical fibers 4 are guided in large numbers from a fiber supply, consisting of a large number of reels 21 containing optical fibers 4, to the upper side of the device as shown, through guiding means (not shown). The fibers 4 enter the device from above, for example over cams, and are then guided, in this case in four groups, each around three rollers 15, 16, 17 and are finally conducted through the pattern plate 5. The rollers 15, 17 serve for pulling a fiber length from the fiber supply each time required for a light panel. For this purpose, the central rollers 16 may be moved horizontally in order to pull a loop between the rollers 15 and 17, while the rollers 15 and 17, around which the optical fibers run, preferably in grooves, are equipped with clamps ensuring that the fibers 4 on the rollers 17 are blocked when the rollers 16 are moved to the right in FIG. 4, so that the fibers 4 are supplied via the rollers 15, and are locked at the rollers 15 and discharged via the rollers 17 when the rollers 16 are moved to the left.

The pattern plate 5 is interchangeably mounted in a pattern plate holder 18 which can be moved up and down by means of a drive 19 and straight guides 20.

It is noted that the drives of the rollers 16, the pattern plate holder 18 and the pinching means 8, or the fiber gripper 13, respectively, are at least partially synchronized in that a central drive motor is coupled to the various parts through several transmission means, or various drive motors for the parts are synchronized. In this way, the movements which are described and shown with reference to FIGS. 1A–R are synchronized where necessary.

Figure 6:
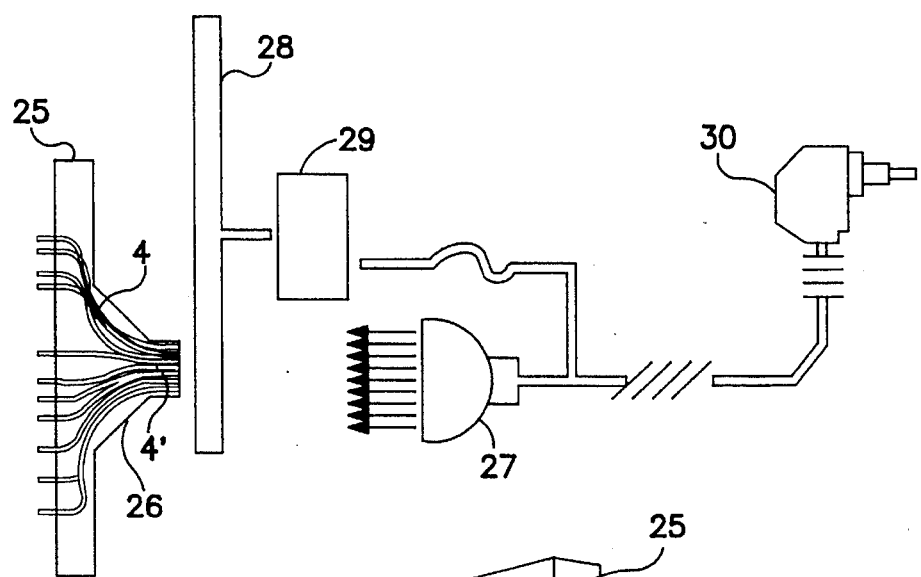
FIGS. 6, 7 and 8 is a very schematic side, perspective front, and perspective rear view, respectively, of a light panel according to the invention, which may be manufactured by the method of FIG. 1.
Figure 7:
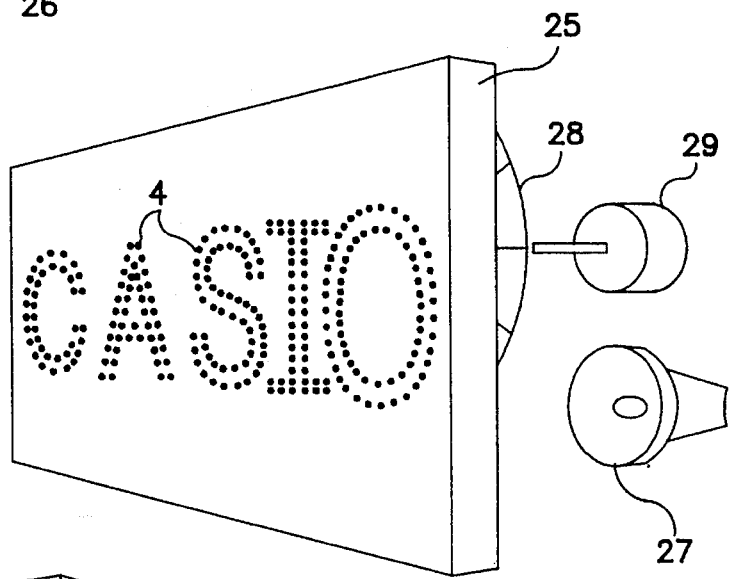
Figure 8:
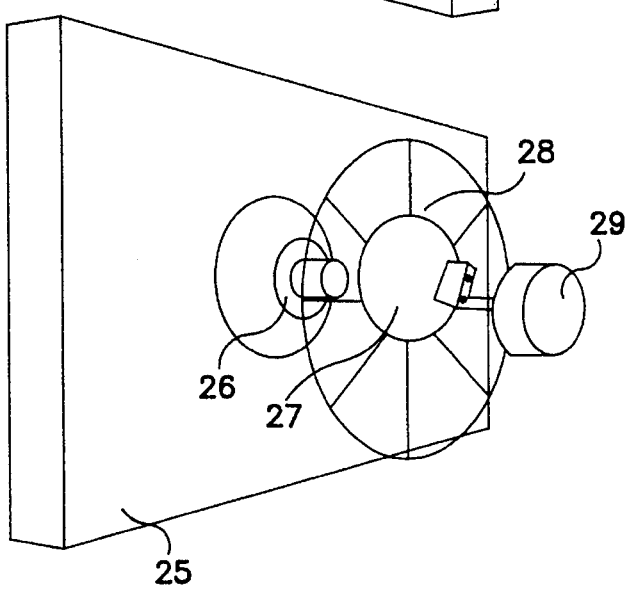

FIGS. 6, 7 and 8 very schematically show the construction of a light panel in which the parts are accommodated within a housing or casing (not shown). There is illustrated the carrier 25 with the fibers 4 and a portion of the fiber bundle 4' therein, the latter terminating at the end of a part 26 projecting from the carrier 25 and being integrally formed therewith. Within the casing or housing (not shown) there is arranged a light source 27 aligned with the fiber bundle 4' to illuminate the fibers 4. A colour disc 28 having a drive motor 29 may be interpositioned for changing the colour of the incident raise of light and there is provided a lead having a connector 30 for the connection to the main supply. In FIG. 7 it is shown that the ends of the fibers 4 form a pattern in the shape of the desired figure.

From the foregoing it will be clear that the invention provides a method and device for manufacturing light panels with which a mass production is permitted in an economical way.

According to an embodiment which is preferred at this moment, the plastic for the carrier is a two component polyurethane resin or, in case of a foamed plastic, a polyurethane containing water. The fibers consist of acryl, such as polymethylmethacrylate, having a thickness between 0.25 and 3.0 mm, preferably 0.5 mm. The number of fibers in a light panel may vary within a large range and may be more than 2000. The mould consists of aluminum and is coated on the inner side with a releasing coating of silicone or Viton®. The enclosure at the connecting ring of the mould may totally be made of Viton® or silicone.

The invention is not restricted to the embodiments shown in the drawings and described herein before, which may be varied in different manners within the scope of the invention. It is, for example, in the case where different optical fibers 4 in the light panel are to emit different colours and/or are not all to light up simultaneously, the common optical fibers can be bundled with the aid of means suitable for the purpose to form separate fiber bundles. For this purpose flexible tubes may for example be mounted to the pattern plate to which the fibers of a certain group are supplied. On the other hand, it is also possible to feed simultaneously through the pattern plate those fibers which are to be brought together as a bundle, in order then to bring them together as a bundle, and to repeat this process as many times as there are bundles to be formed. It is also conceivable to construct the pattern plate so as to be splitable in such a way that, as a result of the splitting thereof, those fibers which are to be combined to form separate bundles are separated from the large array of fibers. It is further noted that it is of course also possible to move the mould instead of the positioning means, in order to bring the mould and positioning means together. The mould may also have all kinds of shapes to mould the carrier. The base of the mould may for example have such configuration that the back side of the carrier is equipped with conical-shaped reflection faces. This is for example favourable if the light panel is used as transparent rear light of a vehicle, in which the fibers serve for radiating light and the reflection faces cause a retro-reflecting effect.

I claim:

1. A method of manufacturing light panels comprising a carrier having optical fibers therein according to a certain pattern including the steps of taking optical fibers from a fiber supply and positioning them in accordance with said pattern, bunching the ends of the fibers at a distance from where they are maintained in the certain pattern, providing a mold containing castable or injectable and quickly setting material forming a carrier having an upper surface facing the fiber supply, introducing a portion of the fibers including the bunched ends through the mold while holding the fibers in the certain pattern generally normal to the upper surface of the carrier during the setting of the material within the mold, cutting the fibers extending from the upper surface of the carrier adjacent the upper surface of the carrier after the material has set to an extent that the optical fibers at the upper carrier surface maintain their orientation substantially normal to said carrier surface.

2. The method of claim 1 wherein prior to the introduction of the optical fibers into the mold the optical fibers leading away from the fiber supply are grouped into a plurality of bundles.

3. The method of claim 1 wherein when the optical fibers leading away from the fiber supply are introduced into the mold, the grouped fiber ends are guided out of the mold through at least one opening in a mold wall, which wall is provided with an enclosure preventing the discharge of the material.

4. The method of any of claims 1, 2, or 3 wherein the mold is filled with castable or injectable material before the optical fibers are introduced into the mold.

5. The method of claim 3 wherein an enclosure for the optical fibers in the mold wall is maintained in a position so that when the material is introduced into the mold the material is prevented from flowing out of the mold into the enclosure, and after the introduction of the optical fibers into the enclosure the enclosure is sealed around the optical fibers and moved such that the material is free to flow into the enclosure and at least partially around the fiber bundle disposed therein.

6. The method of claims 1 or 2 wherein the fibers are guided laterally out of the mold.

7. The method of claim 1 wherein the optical fibers are maintained generally normal to the upper surface of the carrier by positioning means, which positioning means are moved away from the upper carrier surface back to a starting position after the material has set to maintain the aforesaid orientation of the optical fibers between the carrier surface and the positioning means before the fibers are cut.

8. The method of claim 1 wherein the mold or a part thereof forms a prefabricated part of the carrier.

9. The method of claim 1 wherein foamed plastic is used for at least a part of the carrier.

10. Apparatus for manufacturing a light panel comprising a fiber supply, a mold within which the light panel is to be formed, means for introducing a castable or injectable material into the mold, means for supplying and means for positioning fibers in a desired pattern adjacent the mold, means for displacing and grouping the ends of the fibers extending through the positioning means but spaced from the positioning means, means for providing relative movement of the fiber positioning means and the mold whereby the displaced fiber ends extend through the mold and the fibers at the upper surface of the mold are disposed normal thereto in the desired pattern and means for severing the fibers at the upper surface of the mold.

11. The apparatus of claim 10 wherein the fiber displacing means also include fiber bundling means for the ends of the fibers.

12. The apparatus of claims 10 or 11 including means wherein a series of light panels are produced by providing mold displacing means after forming a first light panel and sequentially introducing an empty mold adjacent the fiber supply whereby a new panel can be formed.

13. The apparatus of claim 11 wherein the mold includes a base opening and includes an enclosure positioned to surround the fiber bundle ends in order to prevent the castable or injectable material from flowing through said opening.

14. The apparatus of claim 13 wherein the fiber displacing means comprise means for guiding the fiber bundle ends through the enclosure and the enclosure means pinches the fiber bundle ends for preventing leakage around the fiber bundle ends.

15. The device according to claim 11 wherein there are means for selectively displacing groups of optical fibers for forming several bundles.

16. A method of manufacturing light panels comprising a carrier having optical fibers therein according to a certain pattern including the steps of taking optical fibers from a fiber supply and positioning them in accordance with said pattern, bunching the ends of the fibers at a distance from where they are maintained in the certain pattern, providing a mold, directing the bunched ends of the fibers through the mold, introducing a castable or injectable quickly setting material into the mold for forming a carrier having an upper surface facing the fiber supply while holding the fibers in the preselected pattern generally normal to the upper surface of the carrier during the setting of the material within the mold, and cutting the fibers extending from the upper surface of the carrier adjacent the upper surface of the carrier after the material has set to an extent that the optical fibers at the upper carrier surface maintain their orientation substantially normal to said carrier surface.

17. Apparatus for manufacturing a light panel comprising a fiber supply, a mold within which the light panel is to be formed, means for supplying and means for positioning fibers in a desired pattern adjacent the mold, means for displacing and bunching the ends of the fibers extending through the positioning means but spaced from the positioning means, means for providing relative movement of the fiber positioning means and the mold whereby the displaced fiber ends extend through the mold and the fibers at the upper surface of the mold are disposed normal thereto in the desired pattern, means for introducing a castable or injectable material into the mold, and means for severing the fibers at the upper surface of the mold.

* * * * *